US012806712B2

(12) United States Patent
Kaiser et al.

(10) Patent No.: US 12,806,712 B2
(45) **Date of Patent: *Nov. 24, 2026**

(54) APPARATUS AND METHOD FOR LASER MACHINING A WORKPIECE

(71) Applicant: TRUMPF Laser- und Systemtechnik GmbH, Ditzingen (DE)

(72) Inventors: Myriam Kaiser, Heimsheim (DE); Daniel Flamm, Ludwigsburg (DE); Felix Zimmermann, Ditzingen (DE); Jonas Kleiner, Leonberg (DE)

(73) Assignee: TRUMPF LASER- UND SYSTEMTECHNIK GMBH, Ditzingen (DE)

( * ) Notice: Subject to any disclaimer, the term of this patent is extended or adjusted under 35 U.S.C. 154(b) by 704 days.

This patent is subject to a terminal disclaimer.

(21) Appl. No.: 18/363,015

(22) Filed: Aug. 1, 2023

(65) Prior Publication Data

US 2024/0009764 A1 Jan. 11, 2024

Related U.S. Application Data

(63) Continuation of application No. PCT/EP2022/051538, filed on Jan. 25, 2022.

(30) Foreign Application Priority Data

Feb. 2, 2021 (DE) ..................... 10 2021 102 391.2
Apr. 6, 2021 (DE) ..................... 10 2021 108 509.8

(51) Int. Cl.
*B23K 26/064* (2014.01)
*B23K 26/067* (2006.01)
*B23K 26/359* (2014.01)

(52) U.S. Cl.
CPC ........ *B23K 26/0648* (2013.01); *B23K 26/067* (2013.01); *B23K 26/359* (2015.10)

(58) Field of Classification Search
CPC ........................ B23K 26/0648; B23K 26/067; B23K 26/359; B23K 2103/54; B23K 26/0006;
(Continued)

(56) References Cited

U.S. PATENT DOCUMENTS 9,850,159 B2 12/2017 Bhuyan et al.
9,902,016 B2 2/2018 Kawaguchi et al.
(Continued)

FOREIGN PATENT DOCUMENTS

CN 102528289 A 7/2012
DE 102014116958 A1 5/2016
(Continued)

OTHER PUBLICATIONS

Dimitrios G. Papazoglou et al, "Observation of abruptly autofocusing waves," Optics Letters, May 2011, pp. 1842-1844, vol. 36, Issue 10, Optica Publishing Group, Washington, DC, USA.
(Continued)

*Primary Examiner* — Topaz L. Elliott
(74) *Attorney, Agent, or Firm* — LEYDIG, VOIT & MAYER, LTD.

(57) ABSTRACT

An apparatus for laser machining a workpiece includes a first beam shaping device comprising a beam splitting element for splitting a first input beam into a plurality of component beams, and a focusing optical unit configured to image the component beams into at least one focal zone. The first input beam is split by the beam splitting element by phase imposition on the first input beam. The component beams are focused into different partial regions of the at least one focal zone for forming the at least one focal zone. The at least one focal zone is introduced into the material at a work angle with respect to an outer side of the workpiece for the laser machining of the workpiece. Material modifications associated with a change of a refractive index of the
(Continued)

material are produced in the material by exposing the material to the at least one focal zone.

15 Claims, 11 Drawing Sheets

(58) Field of Classification Search
CPC . B23K 26/0652; B23K 26/0736; B23K 26/53
See application file for complete search history.

(56) References Cited

U.S. PATENT DOCUMENTS

| | | | | |
|---|---|---|---|---|
| 10,328,521 | B2 * | 6/2019 | Sakamoto .......... | B23K 26/0676 |
| 10,442,719 | B2 | 10/2019 | Marjanovic et al. | |
| 10,526,234 | B2 | 1/2020 | Genier | |
| 12,251,776 | B2 * | 3/2025 | Flamm ............... | B23K 26/0617 |
| 2002/0130245 | A1 * | 9/2002 | Fujimoto ............ | C03B 33/0222 250/205 |
| 2012/0111840 | A1 | 5/2012 | Nomaru | |
| 2015/0299018 | A1 * | 10/2015 | Bhuyan .................. | B23K 26/40 65/29.18 |
| 2016/0052083 | A1 * | 2/2016 | Kawaguchi ........ | B23K 26/0648 219/121.75 |
| 2017/0113301 | A1 * | 4/2017 | Sakamoto .......... | B23K 26/0676 |
| 2017/0189991 | A1 | 7/2017 | Gollier et al. | |
| 2017/0252859 | A1 | 9/2017 | Kumkar et al. | |
| 2017/0259375 | A1 | 9/2017 | Kumkar et al. | |
| 2017/0276951 | A1 | 9/2017 | Kumkar et al. | |
| 2018/0117708 | A1 | 5/2018 | Ortner et al. | |
| 2019/0135678 | A1 | 5/2019 | Liu et al. | |
| 2020/0147729 | A1 | 5/2020 | Chang et al. | |
| 2020/0361037 | A1 | 11/2020 | Ivanov et al. | |
| 2020/0388538 | A1 * | 12/2020 | Swoboda ........... | B23K 26/0624 |
| 2021/0165234 | A1 | 6/2021 | Tillkorn et al. | |
| 2021/0354237 | A1 | 11/2021 | Kumkar et al. | |
| 2022/0032398 | A1 | 2/2022 | Kumkar et al. | |
| 2022/0258284 | A1 * | 8/2022 | Flamm ............... | B23K 26/0608 |
| 2024/0165737 | A1 * | 5/2024 | Flamm ............... | B23K 26/0676 |
| 2024/0217031 | A1 * | 7/2024 | Flamm ............... | B23K 26/0006 |

FOREIGN PATENT DOCUMENTS

| | | | | |
|---|---|---|---|---|
| DE | 102015110422 | A1 | | 12/2016 |
| DE | 102018211972 | A1 | | 1/2020 |
| DE | 102019201280 | A1 | | 8/2020 |
| DE | 102019205394 | A1 | | 10/2020 |
| JP | 2001138083 | A | * | 5/2001 |
| JP | 2006068762 | A | | 3/2006 |
| JP | 2011067873 | A | | 4/2011 |
| JP | 2015226012 | A | | 12/2015 |
| JP | 2016503383 | A | | 2/2016 |
| JP | 2017510535 | A | | 4/2017 |
| WO | WO 2014079478 | A1 | | 5/2014 |
| WO | WO 2014156688 | A1 | | 10/2014 |
| WO | WO 2016010954 | A2 | | 1/2016 |
| WO | WO 2016079275 | A1 | | 5/2016 |
| WO | WO 2017055576 | A1 | | 4/2017 |
| WO | WO 2017073907 | A1 | | 5/2017 |
| WO | WO 2018182946 | A1 | | 10/2018 |

OTHER PUBLICATIONS

Nikolaos K. Efremidis et al, “Abruptly autofocusing waves,” Optics Letters, Dec. 2010, pp. 4045-4047, vol. 35, Issue 23, Optica Publishing Group, Washington, DC, USA.

Jens Gottmann et al, “Microcutting and Hollow 3D Microstructures in Glasses by In-volume Selective Laser-induced Etching (ISLE),” JLMN—Journal of Laser Micro/Nanoengineering, Jan. 2013, pp. 15-18, vol. 8, No. 1, Japan Laser Processing Society, Osaka, Japan.

Michael Jenne et al., “High-quality tailored-edge cleaving using aberration-corrected Bessel-like beams,” Optics Letters, Jul. 2018, pp. 3164-3167, vol. 43, Issue 13, , Optica Publishing Group, Washington, DC, USA.

Jens Gottmann et al, “Fabrication of sub-wavelength surface ripples and in-volume nanostructures by fs-laser induced selective etching,” Applied Surface Science, Applied Surface Science, Mar. 2009, pp. 5641-5646, vol. 255, Issue 10, Elsevier, Amsterdam, Netherlands.

* cited by examiner

APPARATUS AND METHOD FOR LASER MACHINING A WORKPIECE

CROSS REFERENCE TO RELATED APPLICATIONS

This application is a continuation of International Application No. PCT/EP2022/051538 (WO 2022/167257 A1), filed on Jan. 25, 2022, and claims benefit to German Patent Application No. DE 102021102391.2, filed on Feb. 2, 2021 and to German Patent Application No. DE 102021108509.8, filed on Apr. 6, 2021. The aforementioned applications are hereby incorporated by reference herein.

FIELD

Embodiments of the present invention relate to an apparatus for laser machining a workpiece which has a material transparent to the laser machining.

Embodiments of the present invention also relate to a method for laser machining a workpiece which has a material transparent to the laser machining.

BACKGROUND

US 2020/0147729 A1 has disclosed a method for forming an angled edge region on a glass substrate by means of a laser beam, wherein the shape of the angled edge region is adapted by adapting an axial energy distribution of the laser beam.

SUMMARY

Embodiments of the present invention provide an apparatus for laser machining a workpiece comprising a material transparent to the laser machining. The apparatus includes a first beam shaping device comprising a beam splitting element for splitting a first input beam input coupled into the first beam shaping device into a plurality of component beams, and a focusing optical unit assigned to the first beam shaping device and configured to image the plurality of component beams output coupled from the first beam shaping device into at least one focal zone. The first input beam is split by the beam splitting element by phase imposition on the first input beam. The component beams are focused into different partial regions of the at least one focal zone for forming the at least one focal zone. The at least one focal zone is introduced by the focusing optical unit into the material at at least one work angle with respect to an outer side of the workpiece for the laser machining of the workpiece. Material modifications associated with a change of a refractive index of the material are produced in the material by exposing the material to the at least one focal zone.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
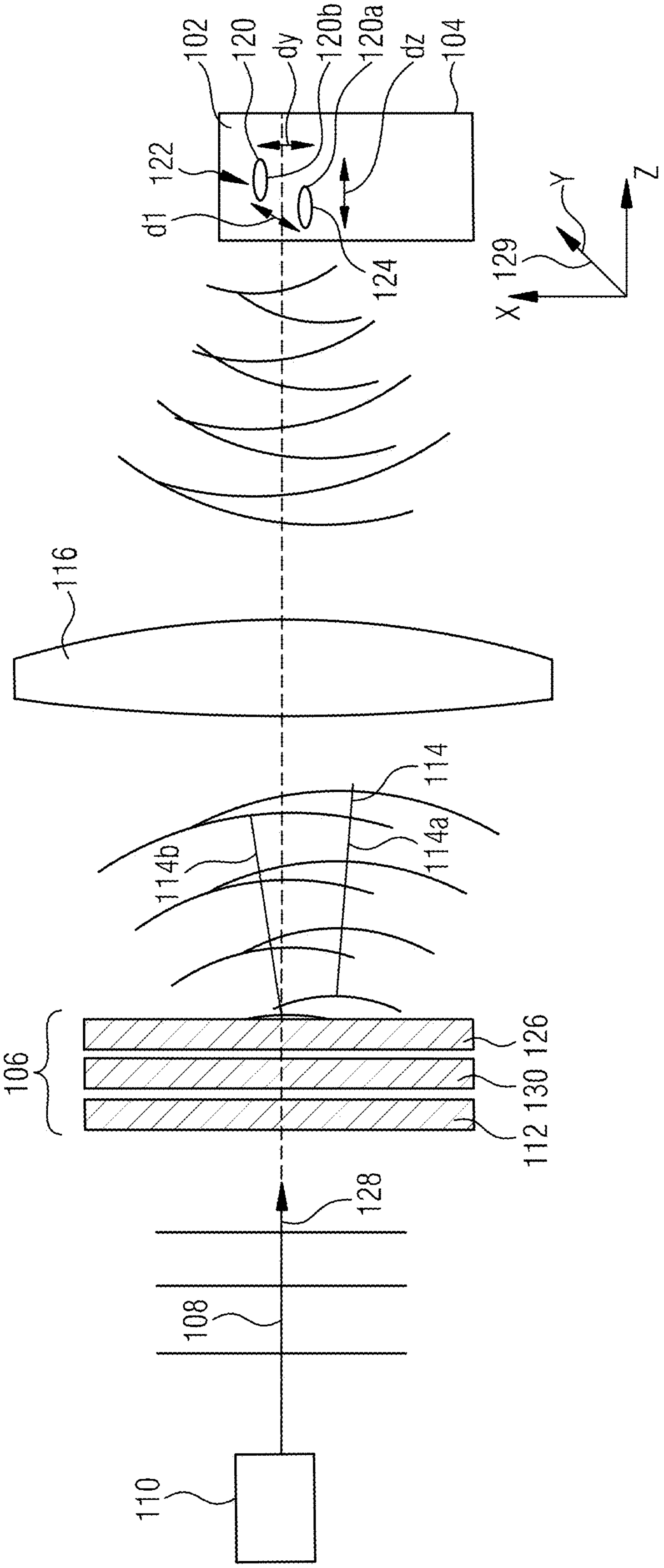
FIG. 1 shows a schematic illustration of an exemplary embodiment of an apparatus for laser machining a workpiece.

Embodiments of the present invention provide an apparatus and a method, which are flexibly usable in many ways and by means of which, in particular, laser machining of the workpiece along different machining geometries is implementable in technically simple fashion.

According to some embodiments, the apparatus comprises a first beam shaping device with a beam splitting element for splitting a first input beam input coupled into the first beam shaping device into a plurality of component beams, and a focusing optical unit which is assigned to the first beam shaping device and serves to image component beams output coupled from the first beam shaping device into at least one focal zone, wherein the first input beam is split by means of the beam splitting element by phase imposition on the first input beam, wherein the component beams are focused into different partial regions of the at least one focal zone for the purpose of forming the at least one focal zone, wherein the at least one focal zone is introduced by means of the focusing optical unit into the material at at least one work angle with respect to an outer side of the workpiece for laser machining the workpiece, and wherein material modifications which are associated with a change of a refractive index of the material are produced in the material by exposing the material to the at least one focal zone.

By splitting the first input beam by means of the beam splitting element on the basis of phase imposition and by subsequently focusing the formed component beams, it is possible for the at least one focal zone to be formed with different geometries in technically simple fashion. As a result, the at least one focal zone can be formed with different portions in particular, which portions each have a different geometry and/or a different work angle. As a result, laser machining of the workpiece with different machining geometries can be achieved in technically simple fashion.

According to embodiments of the invention, the at least one focal zone, in particular, can be introduced into the material at the work angle without this requiring an angling of an optical unit with respect to the workpiece.

The material modifications being associated with a change of the refractive index of the material should be understood to mean that, in particular, the material modifications are accompanied by a change in the refractive index of the material and/or there is a change in the refractive index of the material when the material modifications are formed.

In particular, the beam splitting element is formed as a diffractive beam splitting element and/or as a 3-D beam splitting element. The beam splitting element preferably brings about a phase imposition on a beam cross section of the first input beam.

In particular, the first input beam is split by means of the beam splitting element by way of a pure phase manipulation of the phase of the first input beam. In particular, the phase imposition on the first input beam implemented by means of the beam splitting element is variably adjustable and/or definable.

In particular, provision can be made for the at least one focal zone to have a plurality of focal distributions and/or to be formed from a plurality of focal distributions. By way of example, the focal distributions are arranged in the different partial regions of the focal zone.

Respective focal distributions of the focal zone are arranged in the focal zone, in particular at a distance from one another. However, it is possible for the respective focal distributions to spatially overlap at least in certain portions.

In particular, the at least one focal zone extends in a plane. The focal distributions from which the at least one focal zone is formed are preferably arranged in a plane. In particular, this plane is oriented perpendicular to an advancement direction in which the at least one focal zone is moved relative to the workpiece for the purpose of laser machining the workpiece.

In particular, a lens component and/or grating component of the phase distribution imposed by means of the beam splitting element is assigned to each focal distribution of the at least one focal zone. In particular, the imposed phase distribution comprises a plurality of superposed lens components and/or grating components, with each focal distribution of the at least one focal zone being assigned a lens component and/or grating component. As a result, it is possible to arrange different focal distributions of the focal zone with a spatial offset in a plane oriented perpendicular to an advancement direction in which the focal zone is moved relative to the workpiece for the purpose of laser machining the workpiece.

By way of example, the first beam shaping device is in the form of a far field beam shaping element or comprises one or more far field beam shaping elements. By way of example, the at least one focal zone is formed by focusing component beams output coupled from the first beam shaping device into the respective partial regions of the focal zone by means of the focusing optical unit.

By way of example, the focusing optical unit is in the form of a microscope objective or lens element.

In an embodiment, provision can be made for the first beam shaping device to be rotatable or rotated about an axis parallel to a main propagation direction of the first input beam. As a result, it is possible to rotate the at least one focal zone, for example about an axis of rotation oriented perpendicular to an advancement direction in which the at least one focal zone is moved relative to the workpiece for the purpose of laser machining the workpiece.

Provision can be made for the focusing optical unit to be integrated into the first beam shaping device and/or for the focusing optical unit to be a part of the first beam shaping device and/or for a functionality of the focusing optical unit to be integrated into the first beam shaping device.

In particular, the material of the workpiece is produced from a material transparent to a laser beam from which the at least one focal zone is formed.

A transparent material should be understood to mean in particular a material through which at least 70% and in particular at least 80% and in particular at least 90% of a laser energy of a laser beam forming the at least one focal zone is transmitted.

In particular, the first input beam is a first input beam input coupled into the first beam shaping device and/or into the beam splitting element.

In particular, provision can be made for the material modifications produced in the material by means of the at least one focal zone to be Type I and/or Type II modifications. As a result, material modifications which are accompanied by a change of the refractive index of the material are produced in the material of the workpiece during the laser machining. In particular, the material can be separated at these material modifications.

In an embodiment, the apparatus comprises a second beam shaping device for beam shaping the first input beam input coupled into the first beam shaping device, wherein a focal distribution with a defined geometric shape and/or with a defined intensity profile is assigned to the first input beam by means of the second beam shaping device by phase imposition on a second input beam incident on the second beam shaping device, with the result that focusing the component beams output coupled from the first beam shaping device into different partial regions of the focal zone by means of the focusing optical unit in each case forms focal distributions which are based on this geometric shape and/or based on this intensity profile. As a result, a geometry of focal distributions from which the at least one focal zone is formed can be adapted. As a result, a flexible and multifaceted use of the apparatus is made possible.

In particular, the second beam shaping device is arranged upstream of the first beam shaping device in relation to a main propagation direction of laser beams guided by the apparatus.

In particular, the second input beam is an input beam of the second beam shaping device. By way of example, the second input beam is a laser beam with in particular a Gaussian beam profile, provided by a laser source of the apparatus.

In particular, the first input beam is a beam output coupled from the second beam shaping device and/or a beam provided by means of the second beam shaping device.

In particular, the second beam shaping device modifies and/or adapts a focal distribution assigned to the second input beam input coupled into the second beam shaping device. In particular, a focal distribution modified and/or adapted by means of the second beam shaping device is assigned to the first input beam provided by means of the second beam shaping device.

In an embodiment, provision can be made for the second beam shaping device to be rotatable or rotated about an axis parallel to a main propagation direction of the second input beam. As a result, it is possible to rotate the at least one focal zone, for example about an axis of rotation oriented perpendicular to an advancement direction in which the at least one focal zone is moved relative to the workpiece for the purpose of laser machining the workpiece.

In particular, provision can be made for the phase imposition on the second input beam to be such that the focal distribution has an elongated shape in relation to an assigned main direction of extent and/or for the phase imposition on the second input beam to be such that the focal distribution has a quasi-nondiffractive and/or Bessel-like intensity profile. As a result, the at least one focal zone can be constructed, for example from a plurality of focal distributions with an elongated shape. As a result, it is possible in particular to form the corresponding elongate and/or line-like material modifications, as a result of which an improved introduction of etching liquid for material separation, for example, is enabled.

The second beam shaping device is or comprises a beam shaping element for implementing the phase imposition in particular, for example a diffractive optical element and/or an axicon element.

In particular, the main direction of extent of the focal distribution with the elongated shape is oriented at an angle and in particular perpendicular to an advancement direction in which the at least one focal zone is moved relative to the workpiece for the purpose of laser machining the workpiece.

It may be advantageous if the phase imposition on the second input beam is such that the focal distribution has an intensity profile in relation to an assigned main direction of extent which, proceeding from a maximum intensity at an intensity maximum of the intensity profile, falls to $1/e^2$-times the maximum intensity faster than in the case of a Gaussian intensity profile by approximately a factor of 3, and/or if the phase imposition on the second input beam is such that the focal distribution has a shape and/or an intensity profile of an abruptly autofocusing beam. As a result of the fast drop in intensity of these focal distributions, there is more precise material machining with reduced damage to the material to be machined. As a result, the material can be separated in particular with a particularly planar and/or smooth edge.

By way of example, the drop in intensity from the maximum intensity to $1/e^2$-times the maximum intensity is faster than in the case of a Gaussian intensity profile by at least a factor of 2.5 and/or faster by no more than a factor of 3.5.

In particular, proceeding from the intensity maximum in the main direction of extent, the intensity profile has a dropping intensity flank where the intensity drop is formed. In particular, the intensity of the intensity profile in the main direction of extent after the dropping intensity flank is below the value of 1/e 2-times the maximum intensity.

Preferably, the dropping intensity flank faces a product piece segment when laser machining the workpiece. As a result, a particularly smooth cutting edge can be realized in particular within the scope of a material separation.

The aforementioned intensity maximum is in particular a principal maximum and/or a global maximum of the intensity profile. In particular, the intensity profile has one or more secondary maxima, which adjoin the intensity maximum counter to the main direction of extent. In particular, a respective maximum intensity of the secondary maxima decreases with increasing distance from the principal maximum.

In particular, the secondary maxima are located in a residual workpiece segment and/or scrap segment when laser machining the workpiece. As a result, cracks and/or channels, for example, which promote an etching attack for material separation, can be formed in the residual workpiece segment and/or scrap segment.

In particular, the main direction of extent of these focus distributions is oriented parallel or approximately parallel to a main propagation direction of the second input beam.

Provision can be made for an intermediate image of the focal distribution to be formed by means of the second beam shaping device, wherein in particular the intermediate image of the focal distribution is arranged upstream of the first beam shaping device in relation to a main propagation direction of the second input beam.

The second beam shaping device is in the form of a near field beam shaping device in particular, which is to say imaging of the focal distribution as an intermediate image is implemented by means of the second beam shaping device in particular.

In particular, the intermediate image formed by means of the second beam shaping device is an image representation of the focal distribution assigned to the first input beam input coupled into the first beam shaping device.

In an embodiment, the apparatus comprises a far field optical unit assigned to the second beam shaping device, wherein the far field optical unit is used for far field focusing of an output beam output coupled from the second beam shaping device into a focal plane of the far field optical unit and wherein in particular the first beam shaping device is arranged in a region of this focal plane.

In particular, an output beam output coupled from the far field optical unit then corresponds to the first input beam to be input coupled into the first beam shaping device.

The region of the focal plane should in particular be understood to mean a region extending around the focal plane, which region in particular has a maximum distance of 10% of a focal length of the far field optical unit from the focal plane.

In particular, provision can be made for the far field optical unit to be used for far field focusing of the intermediate image of the focal distribution formed by means of the second beam shaping device into the focal plane.

In particular, the far field optical unit brings about a Fourier transform of the intermediate image produced by means of the second beam shaping device and/or of the focal distribution produced by means of the second beam shaping device.

Provision can be made for the far field optical unit to be integrated into the second beam shaping device and/or for the far field optical unit to be a part of the second beam shaping device and/or for the functionality of the far field optical unit to be integrated into the second beam shaping device.

In particular, a transverse intensity distribution of the first input beam has a ring structure and/or a ring segment structure in the focal plane.

Provision can be made for the far field optical unit and the focusing optical unit to form a telescope device, and/or for the far field optical unit and the focusing optical unit to have a common focal plane, wherein in particular the first beam shaping device is arranged in a region of this common focal plane.

In particular, a focal length of the far field optical unit is greater than a focal length of the focusing optical unit.

In particular, provision can be made for the first input beam to be assigned to a focal distribution with a defined geometric shape and/or with a defined intensity profile, wherein the component beams output coupled from the first beam shaping device are likewise assigned this geometric shape and/or this intensity profile, and/or wherein using the focusing optical unit to focus the component beams output coupled from the first beam shaping device into different partial regions of the at least one focal zone leads to the respective formation of focal distributions on the basis of this geometric shape and/or on the basis of this intensity profile. As a result, the at least one focal zone, in particular, can be constructed from mutually spaced apart and/or adjacent focal distributions with a defined geometry. Further, this for example yields a formation of the at least one focal zone by stringing together focal distributions as virtually identical copies on account of beam splitting by means of the beam splitting element.

An assignment of a defined geometric shape and/or defined intensity profile to the first input beam is for example implemented by means of a laser source which provides the first input beam. Alternatively, the assignment is implemented by means of the above-described second beam shaping device.

In an embodiment, the first input beam incident on the beam splitting element and/or on the first beam shaping device has a Gaussian intensity profile, for example if it originates directly from a laser source. As a result, the at least one focal zone is then for example constructed and/or formed from a plurality of adjacent "focal points" with a Gaussian shape and/or Gaussian intensity profile.

It may be advantageous if the first beam shaping device comprises a beam shaping element for modifying the focal distribution assigned to the first input beam, wherein the beam shaping element is used to bring about a modification and/or alignment of the geometric shape and/or intensity profile of the focal distribution, imaged into the at least one focal zone, in a cross-sectional plane oriented perpendicular to an advancement direction, in which the at least one focal zone is moved relative to the workpiece for laser machining the workpiece, and/or wherein the beam shaping element is used to bring about a modification and/or alignment of the geometric shape and/or intensity profile of the focal distribution, imaged into the at least one focal zone, in a cross-sectional plane oriented parallel to an advancement direction, in which the at least one focal zone is moved relative to the workpiece for laser machining the workpiece.

In particular, the cross-sectional plane oriented parallel to the advancement direction is oriented perpendicular to a main propagation direction of beams from which the focal distribution is formed.

The beam shaping element of the first beam shaping device is used in particular to implement a modification within and/or by means of the first beam shaping device of the input beam input coupled into the first beam shaping device.

In particular, the beam shaping element is or comprises a diffractive or refractive beam shaping element, and/or the beam shaping element is or comprises a diffractive field mapper. In particular, the beam shaping element can be used to impose defined wavefront aberrations onto an input beam input coupled into the beam shaping element.

In particular, the beam shaping element is configured so that the component beams output coupled from the first beam shaping device are assigned the focal distribution modified by means of the beam shaping element, with the result that focusing the component beams, output coupled from the first beam shaping device, by means of the focusing optical unit into different partial regions of the focal zone results in the respective formation of focal distributions with this modified geometric shape and/or with this modified intensity profile.

In particular, this modified shape and/or this modified intensity distribution is based on an original shape and/or an original intensity profile, which is assigned to the first input beam. In particular, a modified shape and/or modified intensity distribution should be understood to mean a modification that is based on the original shape and/or original intensity profile.

It may be advantageous if an alignment of a main direction of extent of the geometric shape and/or intensity profile of the focal distribution is adjustable or adjusted in a cross-sectional plane oriented perpendicular to the advancement direction by means of the beam shaping element, and in particular if the alignment is adjusted so that the main direction of extent is oriented parallel or approximately parallel to a corresponding local direction of extent of the focal zone. By way of example, a formation of material modifications in the material of the workpiece which are oriented approximately parallel to the local direction of extent of the focal zone can be achieved thereby. In particular, this enables an optimized separation of the material.

Provision can also be made for the alignment of the main direction of extent of the geometric shape and/or of the intensity profile of the focal distribution to be implemented in such a way that the main direction of extent is oriented at an angle to the corresponding local direction of extent. By way of example, the main direction of extent includes a smallest angle of at least 1° and/or at most 90° with the local direction of extent. As a result, the focal distribution is located for example at least in certain portions in a residual workpiece segment and/or scrap segment that arises during the laser machining of the workpiece. As a result, material modifications and/or channels, which promote an etching attack for material separation, are formed, for example, in the residual workpiece segment and/or scrap segment.

As a matter of principle, it is additionally also possible for the focal distribution in the cross-sectional plane oriented perpendicular to the advancement direction to be modified in such a way by means of the beam shaping element that the said focal distribution has a main direction of extent in this cross-sectional plane perpendicular to the advancement direction.

Provision can be made for the focal distribution in the cross-sectional plane oriented perpendicular to the advancement direction to be modified in such a way by means of the beam shaping element that the said focal distribution has a curved longitudinal center axis.

It may be advantageous if the beam shaping element brings about such a modification of the intensity profile of the focal distribution in a cross-sectional plane oriented parallel to the advancement direction that the intensity profile has at least one preferred direction, wherein in particular the at least one preferred direction is oriented parallel or at an angle or perpendicular to the advancement direction. As a result, a formation of material modifications in the material of the workpiece during the laser machining can be controlled and/or optimized in particular. For example, this enables an improved introduction of etching liquid for material separation purposes.

In particular, the at least one preferred direction and the advancement direction are located in a common plane.

By way of example, the intensity profile of the focal distribution is formed for example elliptically or in rectangular or square fashion in the plane parallel to the advancement direction by means of the beam shaping element.

By way of example, a semimajor axis of the ellipse should be understood to mean the preferred direction of a focal distribution in the form of an ellipse.

By way of example, the preferred direction of the focal distribution in the form of an ellipse is oriented parallel or approximately parallel to the advancement direction.

A focal distribution in the form of a square or rectangle has for example two preferred directions, which are each oriented parallel to a connecting direction of two opposing points of the square. By way of example, one of the preferred directions is oriented parallel to the advancement direction and the other is oriented perpendicular thereto.

It may be advantageous if an alignment of the at least one preferred direction of the focal distribution in the cross-sectional plane oriented parallel to the advancement direction is adjustable or adjusted by means of the beam shaping element of the first beam shaping device. As a result, a formation of material modifications in the material of the workpiece during the laser machining can be controlled and/or optimized in particular.

In particular, provision can be made for the at least one work angle of the at least one focal zone to be at least 1° and/or at most 90°. Preferably, the at least one work angle is at least 10°.

The work angle should be understood to mean in particular the smallest angle between a local direction of extent assigned to the at least one focal zone and an outer side of the workpiece. By way of example, the at least one focal zone is input coupled and/or introduced into the material of the workpiece through this outer side.

Provision can be made for the at least one focal zone to have different portions with different local directions of extent and/or work angles.

It may be advantageous if the first beam shaping device comprises a polarization beam splitting element which is configured so that the component beams output coupled from the first beam shaping device each have one of at least two different polarization states, wherein component beams with different polarization states are focused into adjacent partial regions of the at least one focal zone by means of the focusing optical unit. As a result, the at least one focal zone can be formed by stringing together focal points and/or focal distributions with different polarization states.

Focal points and/or focal distributions with different polarization states are formed in particular from mutually incoherent component beams. As a result, the focal points and/or focal distributions can be arranged and/or juxtaposed with a particularly small distance from one another.

The polarization beam splitting element is used, in particular, to split a beam input coupled into the polarization beam splitting element into a plurality of polarized component beams, which each have one of at least two different polarization states.

By way of example, the polarization beam splitting element comprises a birefringent wedge element and/or a birefringent lens element. For example, this allows the generation of a direction offset and/or an angular offset of component beams with different polarization states before the component beams are focused by means of the focusing optical unit. As a result, the component beams with different polarization states can be imaged into spatially different partial regions of the at least one focal zone.

In particular, different polarization states should be understood to mean different linear polarization states.

By way of example, the polarization beam splitter element comprises a quartz crystal for polarization beam splitting purposes.

According to embodiments of the invention, provision is made in the method set forth at the outset for a beam splitting element of a first beam shaping device to be used to split a first input beam incident on the beam splitting element into a plurality of component beams and for the component beams output coupled from the first beam shaping device to be focused into at least one focal zone by means of a focusing optical unit assigned to the first beam shaping device, wherein the first input beam is split by means of the beam splitting element by phase imposition on the first input beam, wherein the component beams are focused into different partial regions of the at least one focal zone for the purpose of forming the at least one focal zone, wherein the at least one focal zone is introduced by means of the focusing optical unit into the material at at least one work angle with respect to an outer side of the workpiece for laser machining the workpiece, and wherein material modifications which are associated with a change of a refractive index of the material are produced in the material by exposing the material to the at least one focal zone.

In particular, provision can be made for the at least one focal zone to be moved relative to the material of the workpiece in an advancement direction for the purpose of laser machining the workpiece. In particular, a relative speed, oriented in the advancement direction, between the material and the at least one focal zone is set or is adjustable.

In particular, provision can be made for material modifications to be formed in the material of the workpiece along a machining line and/or machining surface as a result of a relative movement of the at least one focal zone in relation to the workpiece. In particular, the workpiece can be separated along the machining line and/or machining surface as a result.

It may be advantageous if the material of the workpiece is separable or separated along the machining line and/or machining surface by applying thermal loading and/or mechanical stress and/or by etching by means of at least one wet-chemical solution. By way of example, etching is implemented in an ultrasound-assisted etch bath.

In particular, the apparatus and/or the method according to embodiments of the invention have one or more of the features set forth below:

Provision can be made for the at least one focal zone to extend, and in particular extend continuously, between two different and/or opposing outer sides of the workpiece. By way of example, these outer sides are oriented parallel to one another or at an angle to one another. By way of example, the workpiece can be separated into two different segments as a result, or a segment can be separated from the workpiece for edge machining purposes. As a result, it is possible for example to bevel or chamfer the edge region.

In particular, provision can be made for the at least one focal zone to have focal distributions arranged in such a way that material modifications are formed in a scrap segment and/or residual workpiece segment to be separated from the workpiece. By way of example, the material modifications form channels for improved introduction of etching fluid for material separation purposes.

By way of example, the focal distributions of the at least one focal zone are arranged so that these at least in certain portions are arranged in a residual workpiece segment and/or scrap segment formed during the laser machining of the workpiece, or these at least in certain portions project into a residual workpiece segment formed during the laser machining of the workpiece. By way of example, material modifications and/or channels, which promote a supply of etching liquid to material modifications formed during the laser machining, can be formed in the residual workpiece segment and/or scrap segment as a result. This enables an improved material separation along a machining surface at which the material modifications are arranged.

For the same reason, it may be advantageous if the focal distributions of the at least one focal zone are arranged so that a principal maximum and/or a global maximum of the respective focal distribution faces a product piece segment that arises during the laser machining of the workpiece and/or faces away from a residual workpiece segment.

By way of example, a product piece segment should be understood to mean a useful segment (in contrast to a residual workpiece segment and/or scrap segment) that arises during the separation of the workpiece.

In particular, focal distributions of the focal zone, from which the focal zone is formed, have intensity fluctuations of no more than 20%.

In particular, the apparatus comprises a workpiece mount for the workpiece, which preferably has a nonreflective and/or strongly scattering surface.

In particular, provision can be made for the apparatus to have a laser source for providing a laser beam, from which the at least one focal zone is formable or formed. In particular, a pulsed laser beam and/or an ultrashort pulse laser beam is provided by means of the laser source.

In particular, the at least one focal zone is formed from an ultrashort pulse laser beam or provided by means of an ultrashort pulse laser beam. This ultrashort pulse laser beam comprises ultrashort laser pulses in particular.

By way of example, a wavelength of the laser beam from which the at least one focal zone is formable or formed is at least 300 nm and/or no more than 1500 nm. For example, the wavelength is 515 nm or 1030 nm.

In particular, the laser beam from which the at least one focal zone is formable or formed has a mean power of at least 1 W to 1 kW. For example, the laser beam comprises pulses with a pulse energy of at least 10 μJ and/or at most 50 mJ. Provision can be made for the laser beam to comprise individual pulses or bursts, with the bursts having 2 to 20 subpulses and in particular a time interval of approximately 20 ns.

Provision can be made for the at least one focal zone to be rotatable about an axis of rotation oriented perpendicular to an advancement direction in which the at least one focal zone is moved relative to the workpiece for the purpose of laser machining the workpiece. As a result, the workpiece can be machined along a curved machining line and/or machining surface, for example.

In particular, the at least one focal zone forms a spatially contiguous interaction region for laser machining the workpiece, with localized material modifications which enable a separation of the material in particular being able to be formed in the interaction region in particular by exposing the material of the workpiece to this interaction region. In particular, there is a crack formation and/or a change in a refractive index of the material between mutually adjacent material modifications.

The material modifications introduced into transparent materials by ultrashort laser pulses are subdivided into three different classes; see K. Itoh et al. "Ultrafast Processes for Bulk Modification of Transparent Materials" MRS Bulletin, vol. 31, p. 620 (2006): Type I is an isotropic refractive index change; Type II is a birefringent refractive index change; and Type III is what is known as a void or cavity. In this respect, the material modification created depends on laser parameters of the laser beam, from which the focal zone is formed, such as for example the pulse duration, the wavelength, the pulse energy, and the repetition frequency of the laser beam, and on the material properties such as, among other things, the electronic structure and the coefficient of thermal expansion, and also on the numerical aperture (NA) of the focusing.

The Type I type isotropic refractive index changes are traced back to locally restricted fusing by way of the laser pulses and fast resolidification of the transparent material. For example, quartz glass has a higher density and refractive index of the material if the quartz glass is cooled more quickly from a higher temperature. Thus, if the material in the focal volume melts and subsequently cools down quickly, then the quartz glass has a higher refractive index in the regions of the material modification than in the non-modified regions.

The Type II type birefringent refractive index changes may arise for example due to interference between the ultrashort laser pulse and the electric field of the plasma generated by the laser pulses. This interference leads to periodic modulations in the electron plasma density, which leads to a birefringent property, which is to say directionally dependent refractive indices, of the transparent material upon solidification. A Type II modification is for example also accompanied by the formation of what are known as nanogratings.

By way of example, the voids (cavities) of the Type III modifications can be produced with a high laser pulse energy. In this context, the formation of the voids is ascribed to an explosion-like expansion of highly excited, vaporized material from the focal volume into the surrounding material. This process is also referred to as a micro-explosion. Since this expansion occurs within the mass of the material, the micro-explosion results in a less dense or hollow core (the void), or a microscopic defect in the sub-micrometer range or in the atomic range, which void or defect is surrounded by a densified material envelope. Stresses which may lead to a spontaneous formation of cracks or which may promote a formation of cracks arise in the transparent material on account of the compaction at the shock front of the micro-explosion.

In particular, the formation of voids may also be accompanied by Type I and Type II modifications. By way of example, Type I and Type II modifications may arise in the less stressed areas around the introduced laser pulses. Accordingly, if reference is made to the introduction of a Type III modification, then a less dense or hollow core or a defect is present in any case. By way of example, it is not a cavity but a region of lower density that is produced in sapphire by the micro-explosion of the Type III modification. On account of the material stresses that arise in the case of a Type III modification, such a modification moreover often is accompanied by, or at least promotes, a formation of cracks. The formation of Type I and Type II modifications cannot be completely suppressed or avoided when Type III modifications are introduced. Finding "pure" Type III modifications is therefore unlikely.

In the case of high laser beam repetition rates, the material is unable to cool down completely between the pulses, with the result that cumulative effects of the heat introduced from pulse to pulse may influence the material modification. By way of example, the laser beam repetition frequency may be higher than the reciprocal of the thermal diffusion time of the material, with the result that heat accumulation as a result of successive absorptions of laser energy may occur in the focal zone until the melting temperature of the material has been reached. Moreover, a region larger than the focal zone can be fused as a result of heat transport of the thermal energy into the areas surrounding the focal zone. The heated material cools quickly following the introduction of ultrashort laser pulses, and so the density and other structural properties of the high-temperature state are, as it were, frozen in the material.

The at least one focal zone comprises in particular a plurality of spaced apart and/or adjacent focal distributions, wherein the focal zone may have interruptions and/or zeros, where there is in particular no interaction or negligible interaction with the material, between adjacent focal distributions. In particular, these interruptions of the focal zone have a spatial extent of no more than 10% of a maximum extent and/or maximum length of the focal zone. In particular, these interruptions have a spatial extent of no more than 100 μm and in particular of no more than 50 μm. If there are relatively large interruptions of intensity distributions present, then this should be understood to mean different focal zones.

By way of example, the at least one focal zone has an overall length of between 50 μm and 5000 μm.

To determine spatial dimensions of the at least one focal zone, for example a respective length and/or a respective diameter, the focal zone is considered in a modified intensity distribution which only contains intensity values located above a specific intensity threshold. In this respect, the intensity threshold is selected, for example, such that values below this intensity threshold have such a low intensity that they are no longer relevant for interaction with the material for the purpose of forming material modifications. For example, the intensity threshold is 50% of a global intensity maximum of the actual intensity distribution. A length of the respective focal zone, or a diameter of the respective focal zone, should then be understood to mean a maximum length of extent and/or a length of maximum extent of the respective focal zone along a longitudinal center axis of the focal zone, or in a plane oriented perpendicular to the longitudinal center axis, taken on the basis of the modified intensity distribution.

In particular, the indications "at least approximately" or "approximately" are to be understood in general to mean a deviation of no more than 10%. Unless stated otherwise, the indications "at least approximately" or "approximately" are to be understood to mean in particular that an actual value and/or distance and/or angle deviates by no more than 10% from an ideal value and/or distance and/or angle, and/or that an actual geometric shape deviates by no more than 10% from an ideal geometric shape.

Elements that are the same or have equivalent functions are denoted by the same reference signs in all the exemplary embodiments.

An exemplary embodiment of an apparatus for the laser machining of a workpiece is shown in FIG. 1 and is denoted by 100 in that figure. The apparatus 100 can be used to create localized material modifications in a material 102 of the workpiece 104, such as for example defects on the submicron scale or on the atomic scale which weaken the material. At these material modifications, the workpiece can for example be separated into different segments or a segment can for example be separated from the workpiece 104 in a subsequent step. In particular, the apparatus 100 can be used to introduce material modifications into the material 102 at a work angle so that an edge region of the workpiece 104 can be beveled or chamfered as a result of the separation of a corresponding segment from the workpiece 104.

The apparatus 100 comprises a first beam shaping device 106, into which a first input beam 108 is input coupled. By way of example, this first input beam 108 is a laser beam which for example is provided by means of a laser source 110 and/or output coupled from a laser source 110. In particular, the first input beam 108 should be understood to mean a ray bundle comprising a plurality of rays running in parallel in particular.

The laser beam provided by means of the laser source 110 is in particular a pulsed laser beam and/or an ultrashort pulse laser beam.

The first beam shaping device 106 comprises a beam splitting element 112, by means of which the first input beam 108 is split into a plurality of component beams 114 and/or component ray bundles. In the example shown in FIG. 1, two mutually different component beams 114*a* and 114*b* are indicated.

The first beam shaping device 106 and/or the beam splitting element 112 are each formed as a far field beam shaping element, for example.

For the purpose of focusing the component beams 114 output coupled from the first beam shaping device 106, the apparatus 100 comprises a focusing optical unit 116, into which the component beams 114 are input coupled. By way of example, mutually different component beams 114 are incident on the focusing optical unit 116 with a spatial offset and/or angular offset.

By way of example, the focusing optical unit 116 is in the form of a microscope objective or lens element.

The component beams 114 are focused by means of the focusing optical unit 116 into different partial regions 120 of a focal zone 122, which are introduced into the material 102 of the workpiece 104 for the laser machining thereof.

By way of example, FIG. 1 indicates two different partial regions 120*a* and 120*b*, into which the component beams 114 are focused for the purpose of forming the focal zone 122. Here, for example, the partial region 120*a* is assigned to the component beam 114_a_ and the partial region 120_b_ is assigned to the component beam 114_b_.

A specific focal distribution is assigned to the first input beam 108 which is input coupled into the first beam shaping device 106. This focal distribution should be understood to mean a geometric shape and/or an intensity profile which would be formed by focusing the first input beam 108 prior to the input coupling into the first beam shaping device 106.

By way of example, the first input beam 108, for example provided by means of the laser source 110, has a Gaussian beam profile. Focusing the first input beam 108 prior to the input coupling into the first beam shaping device 106 would lead to a focal distribution with a Gaussian shape and/or Gaussian intensity profile being formed in this case.

In particular, the shape of the focal distribution should be understood to mean a characteristic spatial shape and/or a spatial extent of the focal distribution.

The first input beam 108 input coupled into the first beam shaping device 106 is split in such a way by means of the beam splitting element 112 that this focal distribution is likewise assigned to the component beams 114. Respective focal distributions 124 are formed by focusing these component beams 114 into the different partial regions 120 of the focal zone 122 by means of the focusing optical unit 116, with these focal distributions 124 being based on the focal distribution assigned to the first input beam 108.

As a result, the focal zone 122 is constructed and/or formed by stringing together different focal distributions 124. Presently, different focal distributions 124 should be understood to mean focal distributions 124 at different spatial positions of the focal zone 122, with these different focal distributions 124 having at least approximately the same geometric shape and/or the same geometric intensity profile.

Different focal distributions 124 are arranged in the focal zone 122 at a distance from one another. In principle, it is possible for mutually adjacent different focal distributions 124 to overlap in space.

Beam splitting by means of the beam splitting element 112 in particular causes focal distributions to be formed as identical copies, which are imaged in different partial regions 120 of the focal zone 122.

By way of example, the beam splitting element 112 is in the form of a 3-D beam splitting element. In respect of the technical realization and properties of the beam splitting element 112, reference is made to the scientific publication "Structured light for ultrafast laser micro- and nanoprocessing" by D. Flamm et al., arXiv:2012.10119v1 [physics.optics], Dec. 18, 2020. Express reference is made to the entire content thereof.

In particular, a distance dl and/or a spatial offset between mutually adjacent focal distributions 124 can be set by means of the beam splitting element 112.

By way of example, a distance dx and/or spatial offset in an x-direction and a distance dz and/or spatial offset in a z-direction oriented perpendicular to the x-direction can be set between mutually adjacent focal distributions 124.

To this end, mutually different component beams 114 are for example formed in such a way by means of the beam splitting element 112 that the said different component beams are incident on the focusing optical unit 116 with a specific spatial offset and/or with a specific convergence and/or divergence. The mutually different component beams 114 are then imaged with a spatial offset in the x-direction and/or z-direction arising therefrom by means of the focusing optical unit 116.

To carry out the beam splitting by means of the beam splitting element 112, a defined transverse phase distribution is imposed on a transverse beam cross section of the first input beam 108. By way of example, examples of transverse phase distributions of beams output coupled from the beam splitting element 112 and associated focal zones 122 are respectively shown in FIGS. 12_a,b_ and 12_c,d_ and 12_e,f._

To generate the spatial offset in the x-direction and/or in the z-direction, the phase imposition by means of the beam splitting element 112 is for example implemented in such a way that the assigned phase distribution for each focal distribution 124 has a specific optical grating component and/or optical lens component. On account of the optical grating component, there is an angular deflection of component beams 114 upstream of the focusing optical unit 116, which post-focusing results in a spatial offset in the x-direction. On account of the optical lens component, component beams 114 are incident on the focusing optical unit 116 with different convergence and/or divergence, which post-focusing results in a spatial offset in the z-direction.

Provision can be made for the first beam shaping device 106 to have a polarization beam splitting element 126. The polarization beam splitting element 126 is used to carry out polarization beam splitting of the first input beam 108 and/or a beam output coupled from the beam splitting element 112 into beams which each have one of at least two different polarization states.

As a result of polarization beam splitting by means of the polarization beam splitting element 126, the component beams 114 output coupled from the first beam shaping device 106 each have one of at least two different polarization states. These component beams 114 with different polarization states are focused by means of the focusing optical unit 116 into the different partial regions 120 of the focal zone 122.

By way of example, the polarization beam splitting element 126 is arranged upstream or downstream of the beam splitting element 112 in relation to a main propagation direction 128 of the first input beam 108 input coupled into the first beam shaping device 106.

In the example shown, the main propagation direction 128 is oriented parallel or approximately parallel to the z-direction. In particular, the x-direction and the z-direction are each oriented perpendicular to a y-direction. In the example shown, this y-direction is oriented parallel or approximately parallel to an advancement direction 129, in which the focal distributions 127 are moved relative to the workpiece 104 for laser machining the workpiece 104.

In terms of the functionality and design of the polarization beam splitting element 126, reference is made to the German patent applications with the reference number DE 102020207715.0 (filing date: Jun. 22, 2020) and with the reference number DE 102019217577.5 (filing date: Nov. 14, 2019), neither of which is a prior publication, by the same applicant. Express reference is made to the entire content thereof.

In particular, the polarization states of the component beams 114 should be understood to be linear polarization states, wherein for example two different polarization states are provided and/or wherein for example respective polarization directions of mutually different component beams are aligned at an angle of 90° with respect to one another.

In particular, the component beams 114 are polarized in such a way that an electric field is oriented in a plane perpendicular to the propagation direction of the said component beams (transverse electric).

For the polarization beam splitting, the polarization beam splitting element 126 for example has a birefringent lens element and/or a birefringent wedge element. By way of example, the birefringent lens element and/or the birefringent wedge element are produced from a quartz crystal or comprise a quartz crystal.

By way of example, component beams 114 with different polarization states are formed in such a way by means of the birefringent lens element that the said component beams are imaged with a spatial offset in the z-direction and/or x-direction as a result of focusing by means of the focusing optical unit 116. As a result, focal distributions 124 formed from component beams 114 with different polarization states can be arranged with a spatial offset in the z-direction and/or x-direction, for example in the focal zone 122.

By way of example, a juxtaposition of focal distributions 124 can be realized in the focal zone 122 by means of the polarization beam splitting element 126, wherein mutually adjacent focal distributions 124 are each formed from component beams 114 with different polarization states.

Further, provision can be made for the first beam shaping device 106 to have a beam shaping element 130, by means of which the focal distribution assigned to the first input beam 108 is modifiable following the input coupling thereof into the first beam shaping device 106.

In respect of the technical realization and properties of the beam shaping element 130, reference is made to the scientific publication "Structured light for ultrafast laser micro- and nanoprocessing" by D. Flamm et al., arXiv: 2012.10119v1 [physics.optics], Dec. 18, 2020, and to the book "Laser Beam Shaping: Theory and Techniques", Fred M. Dickey, ed., CRC press, 2014. Express reference is made to the entire content thereof.

By way of example, the beam shaping element 130 is formed as a diffractive or refractive phase element for imposing defined wavefront aberrations on a beam input coupled into the beam shaping element 130. By way of example, the beam shaping element 130 is in the form of a diffractive field mapper.

By way of example, the beam shaping element 130 is formed as a diffractive or refractive phase element for imposing defined wavefront aberrations on a beam input coupled into the beam shaping element 130. By way of example, the beam shaping element 130 is in the form of a diffractive field mapper. For example, the beam shaping element 130 can include diffractive optical elements (DOEs), such as diffractive inverse axicons. The beam shaping element 130 can also include a liquid-crystal-on-silicon-based spatial light modulator (SLM).

In the example shown in FIG. 1, the beam shaping element 130 is arranged between the beam splitting element 112 and the polarization beam splitting element 126. By way of example, the input beam 108 is processed first with the beam splitting element 112 and subsequently with the beam shaping element 130 and/or with the polarization beam splitting element 126.

The beam shaping element 130 renders modifiable a geometric shape and/or an intensity profile of the focal distributions 124 imaged into the focal zone 122.

Figure 3:
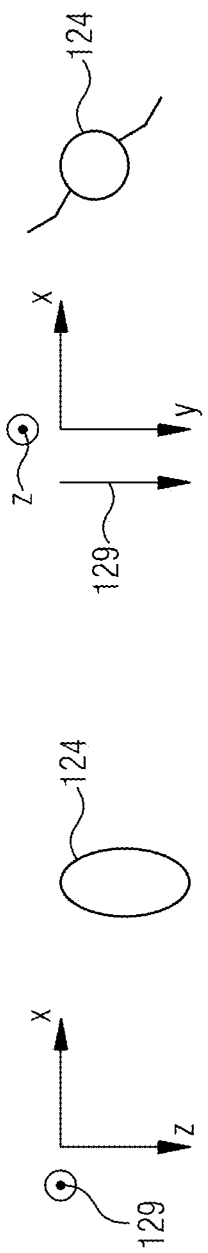
FIG. 3*a* shows a schematic cross-sectional illustration of an exemplary embodiment of a focal distribution of a focal zone for laser machining the workpiece.
FIG. 3*b* shows a schematic cross-sectional illustration of a further exemplary embodiment of a focal distribution of a focal zone for laser machining the workpiece.
FIG. 3*c* shows a schematic cross-sectional illustration of a further exemplary embodiment of a focal distribution of a focal zone for laser machining the workpiece.
Figure 3:
Figure 3:
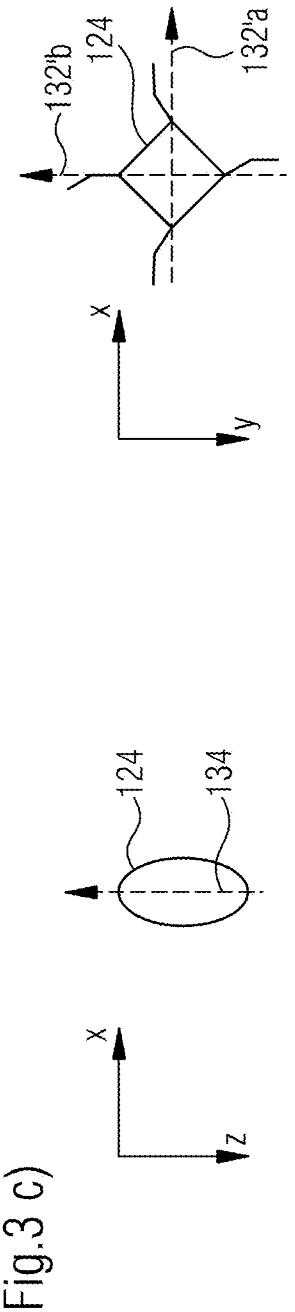

A modification of the focal distributions 124 of the focal zone 122 by means of the beam shaping element 130 can be implemented in a cross-sectional plane parallel to the advancement direction 129, wherein this cross-sectional plane is oriented perpendicular to the main propagation direction 128 and/or perpendicular to the z-direction in particular (FIGS. 3*a*, 3*b*, and 3*c*).

Figure 4:
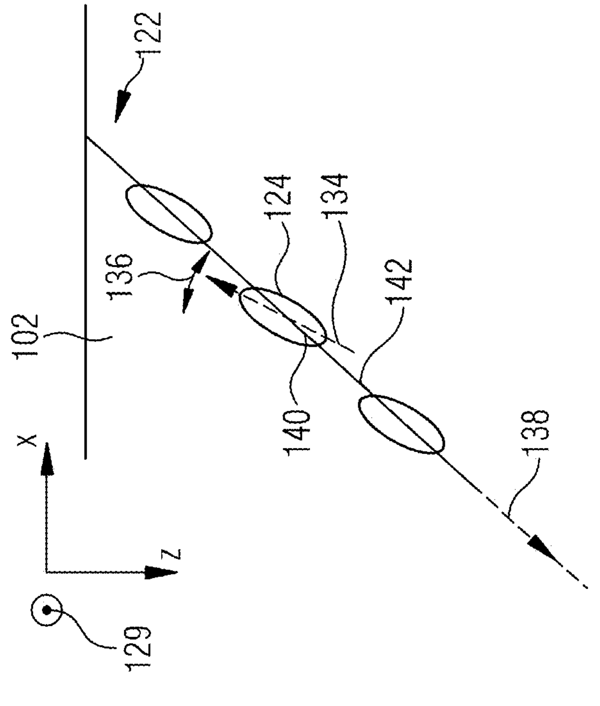
FIG. 4*a* shows a schematic cross-sectional illustration of a portion of an example of a focal zone, which is introduced into a material of the workpiece.
FIG. 4*b* shows a schematic cross-sectional illustration of a portion of a further example of a focal zone, which is introduced into a material of the workpiece.
Figure 4:
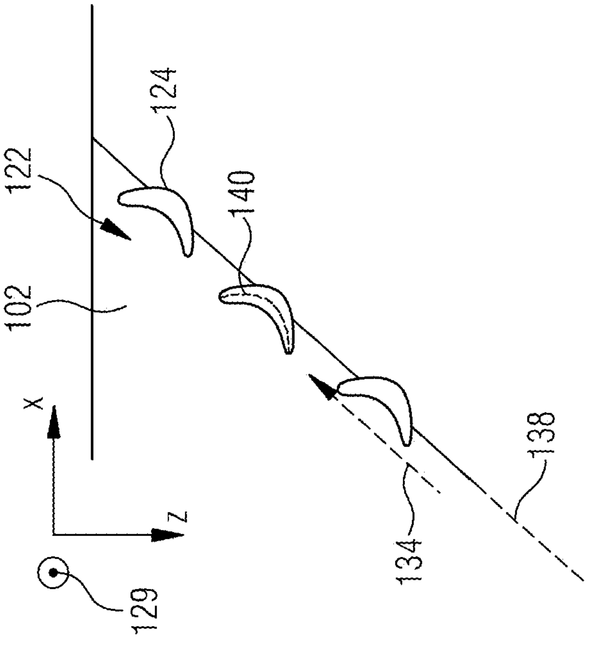

Further, the focal distributions 124 of the focal zone 122 can be modified in a cross-sectional plane perpendicular to the advancement direction 129 by means of the beam shaping element 130 (FIGS. 4*a* and 4*b*). In the example shown, this cross-sectional plane is oriented parallel to the x-direction and parallel to the main propagation direction 128 and/or z-direction.

In relation to the cross-sectional plane oriented parallel to the advancement direction 129, the focal distribution 124 is for example modified in such a way that the shape and/or the intensity profile of the focal distribution 124 has a preferred direction 132 in this cross-sectional plane. In particular, this preferred direction 132 should be understood to mean a direction in which a length of extent of the focal distribution 124 is maximized either locally or globally. By way of example, the preferred direction 132 should be understood to be a main direction of extent of the focal distribution 124.

In the example shown in FIG. 3*b*, the focal distribution 124 is formed elliptically and/or as an ellipse in the plane parallel to the advancement direction 129. In this case, the preferred direction 132 is oriented parallel to a semimajor axis of this ellipse.

In principle, it is also possible for the focal distribution 124 to have a plurality of preferred directions 132. In the example shown in FIG. 3*c*, the focal distribution 124 is formed to be rectangular and/or as a rectangle and in particular as a square in the plane parallel to the advancement direction 129. In this case, the focal distribution 124 has a first preferred direction 132'*a*, which for example is oriented parallel to the x-direction, and a second preferred direction 132'*b*, which for example is oriented at an angle and in particular perpendicular to the x-direction, which is to say parallel to the y-direction in the example shown.

By way of example, the first preferred direction 132'*a* and the second preferred direction 132'*b* are each parallel to connecting lines between mutually opposite corners of the rectangle.

Provision can be made for the focal distribution 124 assigned to the first input beam 108 to have an elongate and/or elongated shape in the cross-sectional plane oriented perpendicular to the advancement direction 129 (FIGS. 4*a* and 4*b*). By way of example, this is realized by virtue of a quasi-nondiffractive and/or Bessel-like beam profile being assigned to the first input beam 108 which is input coupled into the first beam shaping device 106.

By way of example, the focal distribution 124 has a main direction of extent 134, along which the focal distribution 124 has in particular a greater length and/or in particular a greatest extent in the cross-sectional plane oriented perpendicular to the advancement direction 129 (see also FIG. 3*c*). By way of example, the main direction of extent 134 is oriented parallel to a connecting line between a start point and an end point of the focal distribution 124 in relation to a direction of the greatest extent of the focal distribution 124.

In particular, provision can be made for an alignment 136 and/or orientation of the focal distribution 124 in the cross-sectional plane oriented perpendicular to the advancement direction 129 to be adaptable by means of the beam shaping element 130, wherein for example the alignment 136 of the respective main direction of extent 134 of the focal distribution 124 is adaptable.

In the examples shown in FIGS. 4*a* and 4*b*, the alignment 136 of the respective focal distribution 124 is adaptable in the x-z-plane.

By way of example, the respective alignment 136 of the focal distributions 124 is adapted by means of the beam shaping element 130 in such a way that the alignment 136 is oriented parallel or approximately parallel to a local direction of extent 138 of the focal zone 122 assigned to the respective focal distribution 124.

By way of example, the local direction of extent 138 of the focal zone 122 should understood to be a local spacing direction of adjacent focal distributions 124, for example of two or three adjacent focal distributions 124. By way of example, the focal distributions 124 of the focal zone 122 can be arranged in different portions of the focal zone 122 with different local directions of extent 138.

In the cross-sectional plane oriented perpendicular to the advancement direction 129, the focal distribution 124 can for example be provided with a curved shape by way of an adaptation by means of the beam shaping element 130 (FIG. 4*b*). By way of example, this makes it possible to generate the focal distribution 124 in the form of a curved Bessel-like beam and/or accelerated Bessel-like beam.

In terms of the formation and properties of quasi-nondiffractive and/or Bessel-like beams with curved shapes, reference is made to the scientific publication "Bessel-like optical beams with arbitrary trajectories" by I. Chremmos et al., Optics Letters, vol. 37, no. 23, Dec. 1, 2012.

By way of example, the focal distribution 124 has a longitudinal center axis 140 along which it extends. By way of example, this longitudinal center axis 140 has a rectilinear form (FIG. 4*a*). In the case of a focal distribution with a curved shape, the longitudinal center axis 140 has a curved shape or a shape curved in certain portions (FIG. 4*b*).

The focal distributions 124 assigned to the focal zone 122 are arranged along a longitudinal axis 142, which for example has a rectilinear form, of the focal zone 122 by means of the first beam shaping device 106 (FIGS. 4*a* and 4*b*).

The longitudinal axis 142 need not necessarily have a rectilinear and/or continuous form. By way of example, the longitudinal axis 142 can be curved at least in certain portions. It is also possible for the longitudinal axis 142 to have directional changes and, in particular, non-continuous directional changes.

Figure 5:
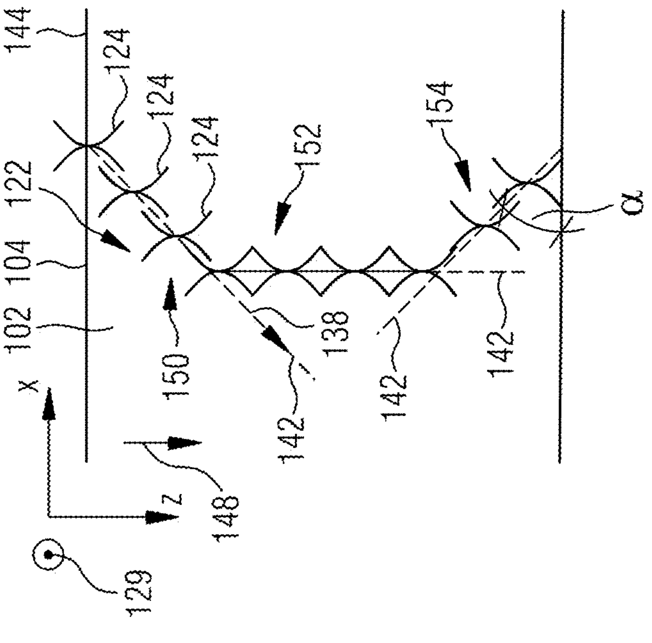
FIG. 5 shows a schematic cross-sectional illustration of a focal zone which completely penetrates the workpiece from a first outer side to a second outer side.

In the example shown in FIG. 5, the focal zone 122 extends within the material 102 of the workpiece 104 from a first outer side 144 of the workpiece 104 to a second outer side 146 of the workpiece 104, wherein the second outer side 146 is spaced apart from the first outer side 144 in relation to a depth direction 148 of the workpiece 104. In particular, the focal zone 122 passes through the workpiece 104 throughout and/or without interruptions in the depth direction 144.

The first outer side 144 and the second outer side 146 of the workpiece 104 are oriented parallel or approximately parallel to one another, for example.

By way of example, for laser machining the workpiece 104, the focal zone 122 is introduced and/or input coupled into the material 102 of the workpiece 104 through the first outer side 144 or through the second outer side 146.

The focal zone 122 has a first portion 150 starting from the first outer side 144, a second portion 152 of the focal zone 122 adjoining the said first portion in the depth direction 148. Further, the focal zone 122 has a third portion 154 following this second portion 152 in the depth direction 148.

In the example shown, the longitudinal axis 142 of the focal zone 122 has a rectilinear form in each of the portions 150, 152, and 154, wherein the longitudinal axis 142 has a directional change, in particular in each case, at the transitions from the first portion 150 to the second portion 152 and from the second portion 152 to the third portion 154.

Each of these portions 150, 152, and 154 is assigned a different local direction of extent 138, in terms of which the focal distributions 122 are arranged.

Further, a specific work angle $\alpha$ is assigned to each of the portions 150, 152, and 154. This work angle $\alpha$ should be understood to mean a smallest angle between the local direction of extent 138 of the corresponding portion 150, 152, 154 and the first outer side 144 and/or second outer side 146.

By way of example, the first portion 150 and the third portion 154 have a work angle $\alpha$ of 45° and the second portion 152 has a work angle $\alpha$ of 90°.

The material 102 of the workpiece 104 is produced from a material transparent to a wavelength of laser beams from which the focal zone 122 and/or the focal distributions 124 are formed.

The focal zone 122 is introduced into the material 102 for the purpose of laser machining the material 102. Respective localized material modifications 156 are formed at the focal distributions 124 by way of this exposure of the material 102 to the focal zone 122 (FIG. 6), which material modifications are for example arranged at a distance from one another along the longitudinal axis 142 of the focal zone 122.

Figure 6:
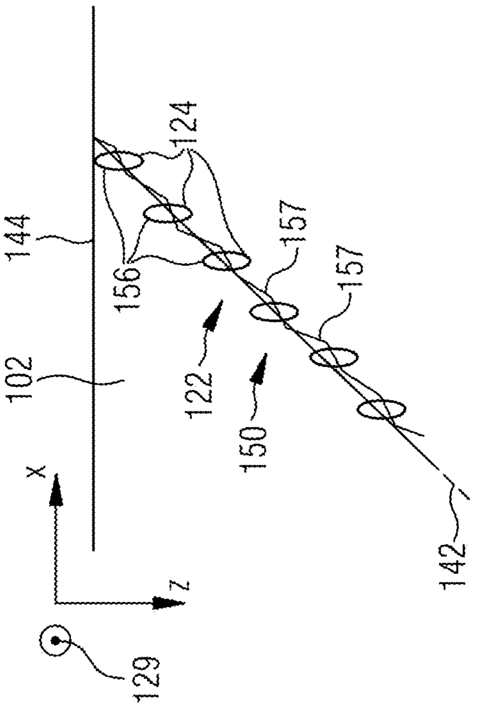
FIG. 6 shows a schematic cross-sectional illustration of material modifications, produced by means of a focal zone, in the material of the workpiece, with these material modifications being accompanied by a crack formation in the material.

A suitable choice of machining parameters, such as laser parameters and/or advancement speed for example, makes it possible to produce the material modifications 156 as Type III modifications, which lead to a spontaneous formation of cracks 157 in the material 102 (FIG. 6). The cracks 157 formed during the laser machining of the material 102 extend between mutually adjacent material modifications 156 in particular.

The advancement speed should be understood to mean a speed of a relative motion between the focal zone 122 and the material 102 in the advancement direction 129.

As an alternative, a suitable choice of the machining parameters makes it possible to produce the material modifications 156 as Type I and/or Type II modifications, which are accompanied by a heat accumulation in the material 102 and/or a change in a refractive index of the material 102.

Figure 7:
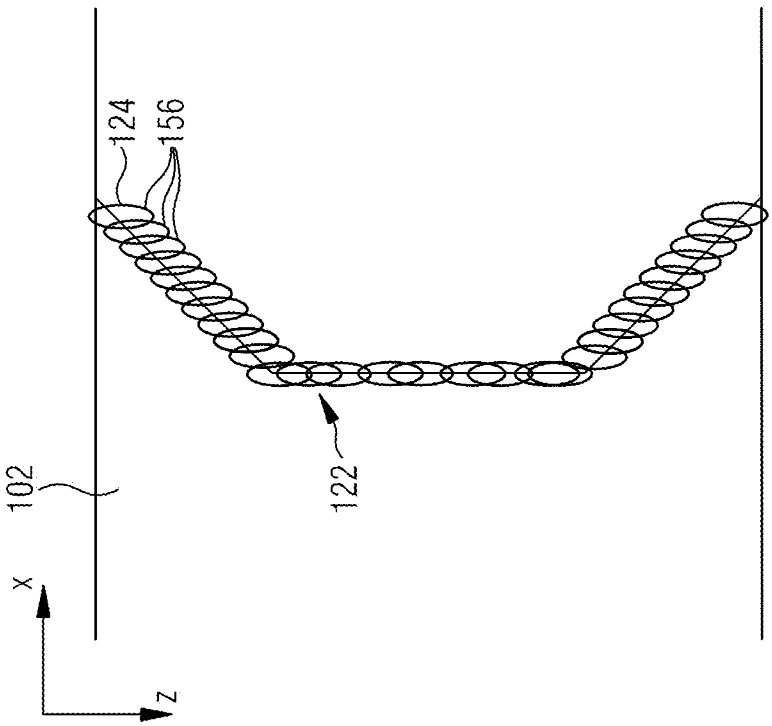
FIG. 7 shows a schematic cross-sectional illustration of material modifications, produced by means of a focal zone, in the material of the workpiece, with these material modifications being produced by means of heat accumulation and/or being accompanied by a refractive index change in the material.

The formation of the material modifications 156 as Type I and/or Type II modifications is associated with a heat accumulation in the material 102 of the workpiece 104. In particular, the produced material modifications 156 are so close together in this case that, during the formation thereof by exposing the material 102 to the focal zone 122, this heat accumulation arises (indicated in FIG. 7).

In an embodiment, the apparatus 100 comprises a second beam shaping device 158 which, in relation to the main propagation direction 128 of the first input beam 108 input coupled into the first beam shaping device 106, is arranged upstream of this first beam shaping device 106. By means of the second beam shaping device 158, it is possible to adapt the focal distribution assigned to the first input beam 108 before the latter is input coupled into the first beam shaping device 106.

In this embodiment, a second input beam 160 which, in particular, is provided by means of the laser source 110 and/or is a laser beam output coupled from the laser source 110 is input coupled into the second beam shaping device 158.

In a manner analogous to the first input beam 108, the second input beam 160 should accordingly be understood to mean, in particular, a ray bundle comprising a plurality of rays running in parallel in particular.

In the example shown, the first input beam 108 input coupled into the first beam shaping device 106 is a beam output coupled from the second beam shaping device 158 and/or a ray bundle output coupled from the second beam shaping device 158.

By means of the second beam shaping device 158 there is a phase imposition on the second input beam 160, as a result of which the focal distribution assigned to the first input beam 108 input coupled into the first beam shaping device 106 is defined. As a result, the geometric shape and/or the intensity profile of the focal distribution assigned to the first input beam 108 can be defined by means of the second beam shaping device 158.

By way of example, the second input beam 160 input coupled into the second beam shaping device 158 has a Gaussian beam profile, which is to say the second input beam 160 has a Gaussian shape and/or a Gaussian intensity profile.

In an embodiment, the second beam shaping device 158 is configured and designed in such a way that, by means of the second beam shaping device 158, a quasi-nondiffractive and/or Bessel-like beam profile is assigned to the first input beam 108 input coupled into the first beam shaping device 106.

Figure 2:
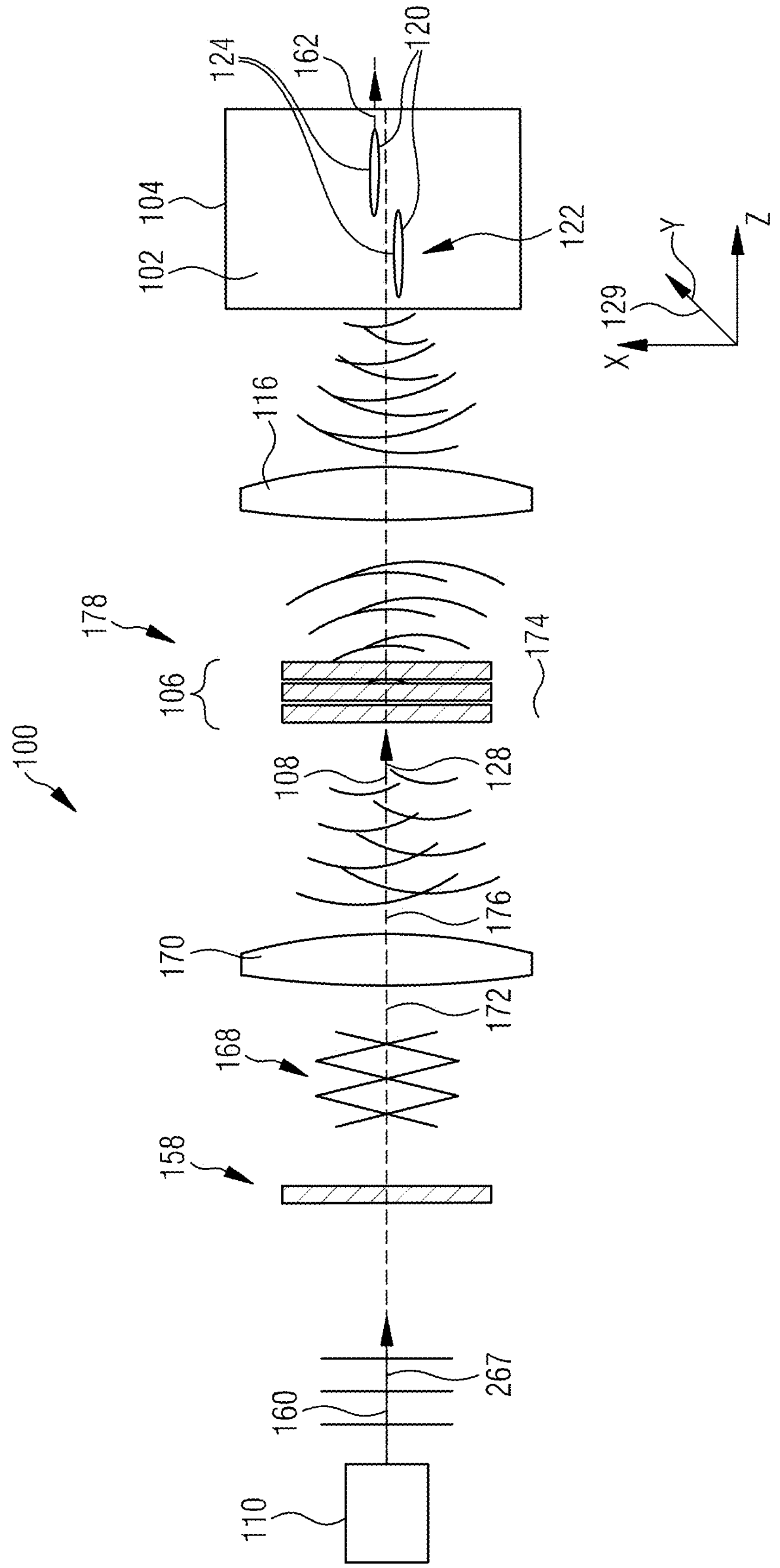
FIG. 2 shows a schematic illustration of a further exemplary embodiment of an apparatus for laser machining a workpiece.
Figure 8:
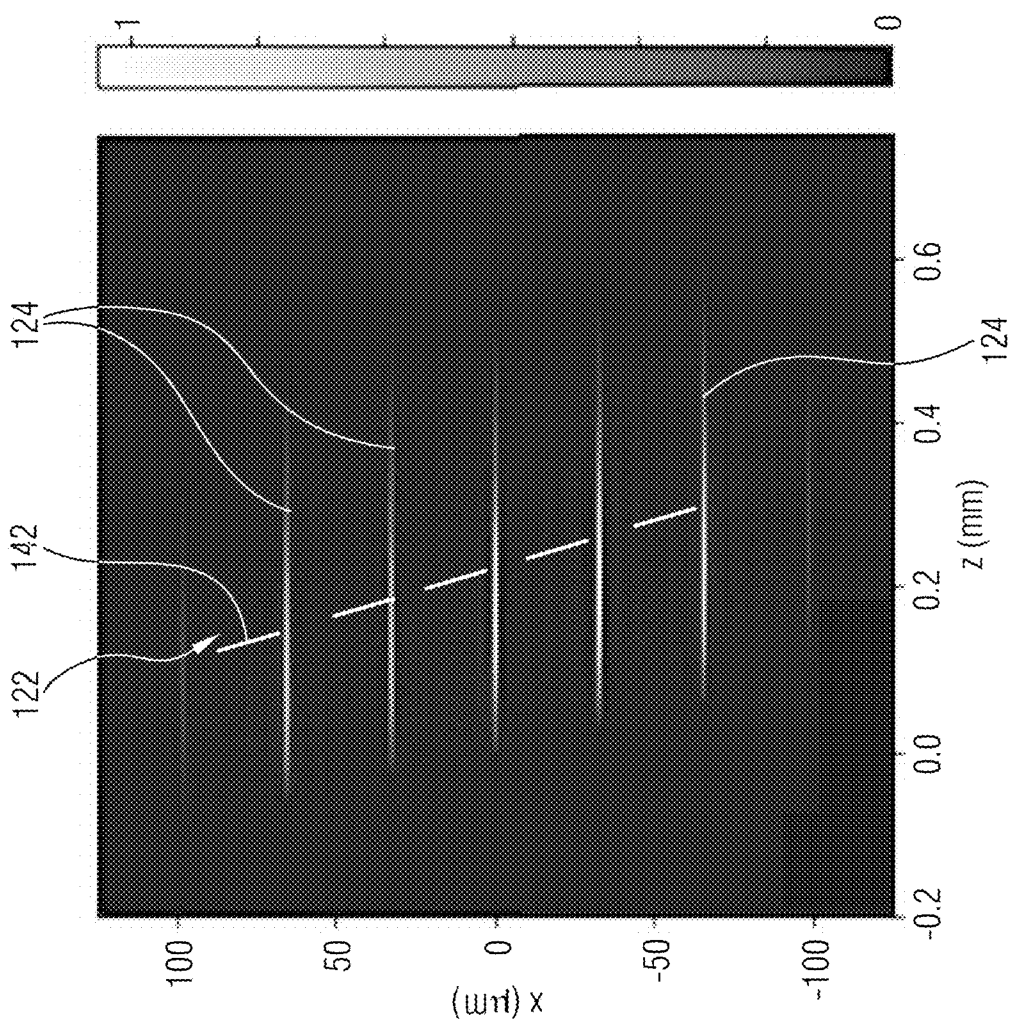
FIG. 8 shows a cross-sectional illustration of a simulated intensity distribution of an example of a focal zone, which has a plurality of spaced apart elongated focal distributions.

As a result, the first input beam 108 can be imaged in particular into a focal distribution with a quasi-nondiffractive and/or Bessel-like beam profile. In this embodiment, the focal distribution 124 imaged into the focal zone 122 has an elongated shape and/or an elongated intensity profile (FIG. 2 and FIG. 8). In particular, the focal distribution 124 of this embodiment has a main direction of extent 162, along which it extends.

By way of example, the second beam shaping device 158 is or comprises a diffractive optical element and/or axicon element for imposing the phase distribution onto the second input beam 160 for the purpose of forming the focal distribution 124 with the elongated shape and/or elongated intensity profile.

The first input beam 108 provided by means of the second beam shaping device 158 in this embodiment is input coupled into the first beam shaping device 106. As described above, this first input beam 108 is split into mutually different component beams 114 by means of the beam splitting element 112 of the first beam shaping device 106, the different component beams being imaged into the different partial regions 120 of the focal zone 122 by means of the focusing optical unit 116. In respect of their shape and/or intensity profile, the focal distributions 124 imaged into the focal zone 122 by means of the focusing optical unit 116 represent copies of the focal distribution assigned to the first input beam 108, wherein focusing by means of the focusing optical unit 116 brings about size-reducing imaging of the focal distributions 124 in particular.

An example of focal distributions 124 with elongated shape and/or elongated intensity profile, imaged into the focal zone 122 by means of the focusing optical unit 116, is depicted in FIG. 8 as a grayscale value distribution, with brighter grayscale values representing greater intensities.

In the example shown in FIG. 8, the focal distributions 124 are oriented at an angle to the longitudinal axis 142 and/or to the local direction of extent 138.

Provision may be made for beam shaping by means of the beam shaping element 130 and/or beam splitting by means of the polarization beam splitting element 126 to be carried out in the first beam shaping device 106, as described above. In this case, the focal distributions 124 imaged by means of the focusing optical unit 116 are based in respect of their shape and/or their intensity profile on the focal distribution assigned to the first input beam 108 but have a modified shape and/or modified polarization properties vis-à-vis the focal distribution assigned to the first input beam 108 on account of the processing by means of the beam shaping element 130 and/or the polarization beam splitting element 126.

Figure 9:
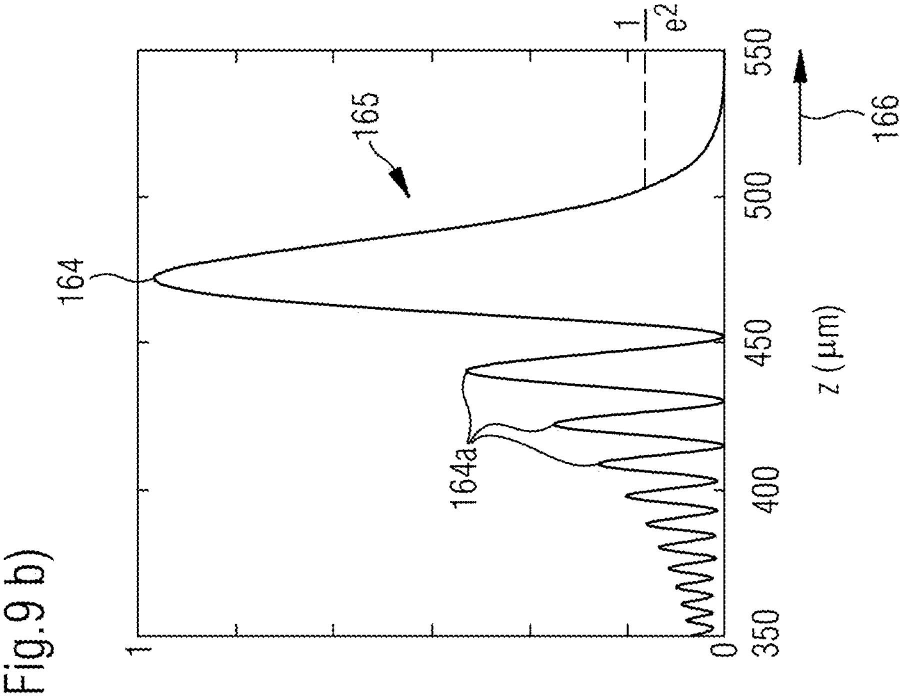
FIG. 9*a* shows a cross-sectional illustration of a simulated intensity distribution of an example of an abruptly autofocusing laser beam.
FIG. 9*b* shows an intensity distribution of the abruptly autofocusing laser beam as per FIG. 9*a* along a main direction of extent of this laser beam.
Figure 9:
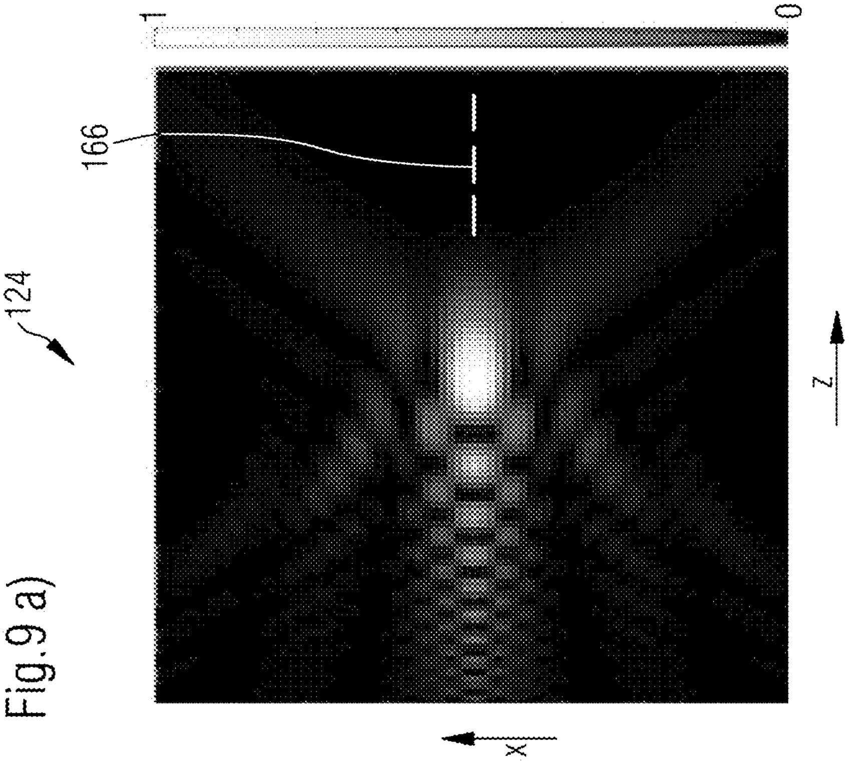

In a further embodiment, the second beam shaping device 158 is configured and designed so that, by means of the second beam shaping device 158, the first input beam 108 input coupled into the first beam shaping device 106 is assigned a beam profile, the intensity profile of which, proceeding from an intensity maximum 164, has an abrupt drop in intensity in relation to a main direction of extent 166 and/or main axis of extent (FIGS. 9*a* and 9*b*). Such beams are referred to as abruptly autofocusing beams, for example.

Figure 10:
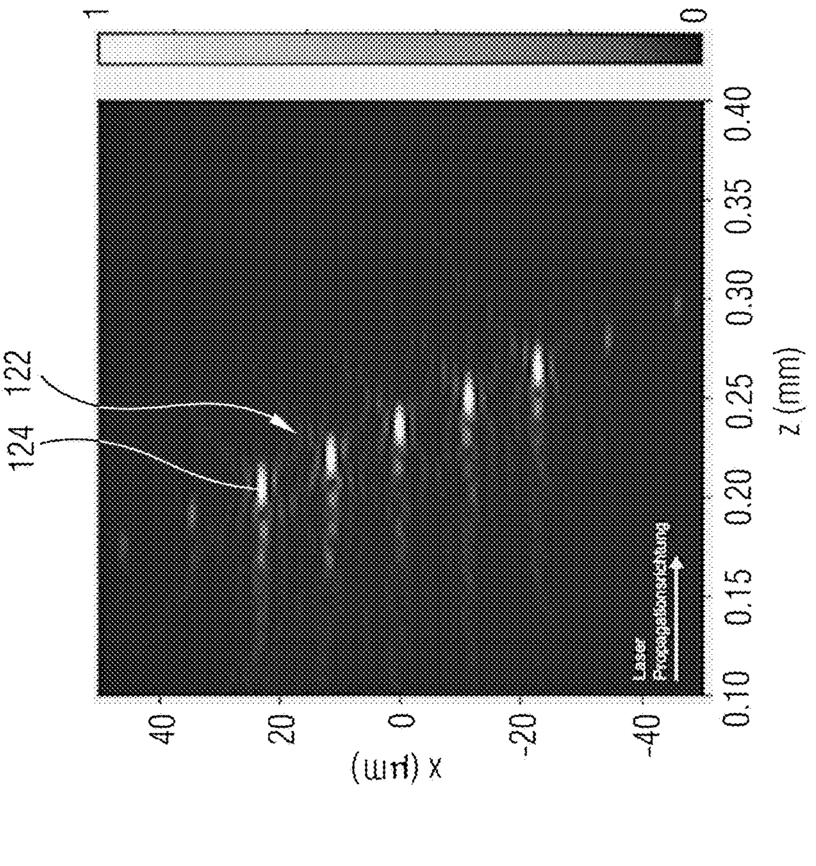
FIG. 10 shows a cross-sectional illustration of a simulated intensity distribution of a focal zone, which has a multiplicity of mutually spaced apart focal distributions in the form of abruptly autofocusing beams.

As a result, the focal zone 122 can be formed from a plurality of focal distributions 124 with such an intensity profile by way of imaging the component beams 114 output coupled from the first beam shaping device 106 (FIG. 10). In particular, the intensity profile of each of the focal distributions 124 of the focal zone 122 then has the abrupt drop in intensity.

Figure 11:
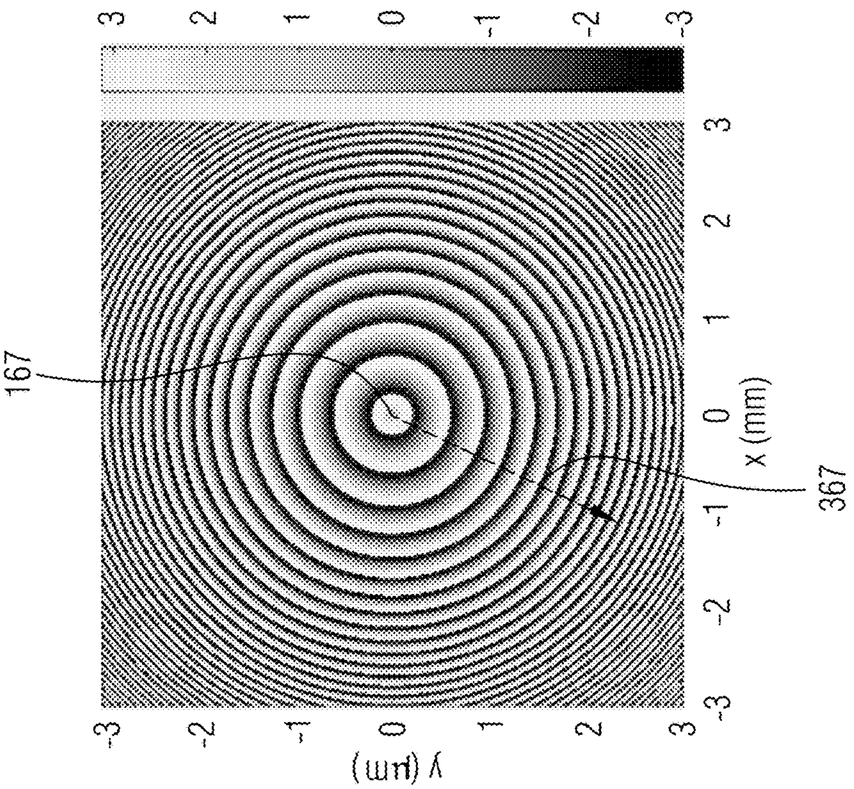
FIG. 11 shows a schematic illustration of a phase distribution assigned to the abruptly autofocusing beams.

A grayscale value representation of an associated two-dimensional phase distribution of beams output coupled from the second beam shaping device 158 is depicted in FIG. 11, with the assigned grayscale value scale ranging from white (a phase of +pi) to black (a phase of −pi).

In particular, the phase distribution has a radially symmetric and/or rotationally symmetrically form vis-à-vis an assigned center axis 167 and/or beam center axis. By way of example, this center axis 167 is oriented parallel or approximately parallel to a main propagation direction 267 of the second input beam 160 incident on the second beam shaping device 158.

In particular, proceeding from the center axis 167, a phase frequency assigned to the phase distribution increases in the radial direction 367 with increasing radial distance from the center axis 167.

In this embodiment, a shape and/or an intensity profile of an abruptly autofocusing beam is assigned to the first input beam 108 input coupled into the first beam shaping device 106. In respect of the formation and properties of such beams, reference is made to the scientific publications "Abruptly autofocusing waves" by Efremidis, Nikolaos K., and Demetrios N. Christodoulides, Optics letters 35.23 (2010): 4045-4047 and "Observation of abruptly autofocusing waves" by Papazoglou et al., Optics letters 36.10 (2011): 1842-1844. Express reference is made to the entire content thereof.

In the embodiment shown in FIGS. 9*a* and 9*b*, the focal distribution 124 has a dropping intensity flank 165 in the main direction of extent 166 when proceeding from the intensity maximum 164.

It is a characteristic of the abruptly autofocusing beam that, at the dropping intensity flank 165, the intensity proceeding from the intensity maximum 164 drops to a value of $1/e^2$ approximately 3 times faster than would be the case for a Gaussian intensity profile.

The intensity maximum 164 is in particular a principal maximum and/or a global maximum of the intensity profile of the abruptly autofocusing beam. In particular, the intensity profile has one or more secondary maxima 164*a* which, proceeding from the intensity maximum 164, follow the intensity maximum 164 counter to the main direction of extent 166. In particular, with increasing distance from the intensity maximum 164 in relation to the main direction of extent 166, the secondary maxima 164 each have a lower maximum intensity value.

In particular, provision can be made for the second beam shaping device 158 to be formed as a near field beam shaping device.

By way of example, an intermediate image 168 (indicated in FIG. 2) of the focal distribution assigned to the first input beam 108 is formed by means of the second beam shaping device 158. In relation to the main propagation direction 128 of the first input beam 108, this intermediate image 168 is arranged between the second beam shaping device 158 and the first beam shaping device 106.

In particular, the second beam shaping device 158 is assigned a far field optical unit 170, by means of which far field focusing into a focal plane 174 of the far field optical unit 170 of an output beam 172 and/or output ray bundle output coupled from the second beam shaping device 158 is implemented.

In particular, far field focusing of the intermediate image 168 into the focal plane 174 is implemented by means of the far field optical unit 170.

In this focal plane 174, the far field focusing of the output beam 172 and/or output ray bundle causes the formation of an intensity distribution in the shape of a ring structure and/or ring segment structure, arranged in particular about an optical axis 176 of the far field optical unit 170.

In the example shown in FIG. 2, a telescope device 178 of the apparatus 100 is formed by means of the far field optical unit 170 and the focusing optical unit 116. To this end, the far field optical unit 170 has in particular a greater focal length than the focusing optical unit 116.

In particular, the focal plane 174 is a common focal plane of the far field optical unit 170 and the focusing optical unit 116. In particular, the focal plane 174 is a focal plane of the telescope device 178.

The first beam shaping device 106 is in particular arranged in the focal plane 174 and/or in a region of the focal plane 174. This region should be understood to mean a region extending around the focal plane 174, which region for example has a maximum distance of 10% of the focal length of the far field optical unit 170 from the focal plane 174. A spacing direction of this maximum distance is oriented parallel to the optical axis 176 and/or main propagation direction 128 of the first input beam 108 in particular.

The aforementioned region of the focal plane 174 should in particular be understood to be a far field region of the telescope device 178, in which far field region there is in particular far field focusing of the output beam 172 output coupled from the second beam shaping device 158 and/or of the first input beam 108 to be input coupled into the first beam shaping device 106.

By means of the beam splitting element 112 of the apparatus 100 it is possible, in principle, to arrange the focal distributions 124 along different paths and thus form focal zones with different geometries.

Figures 12A, 12B, 12C, 12D, 12E, 12F:
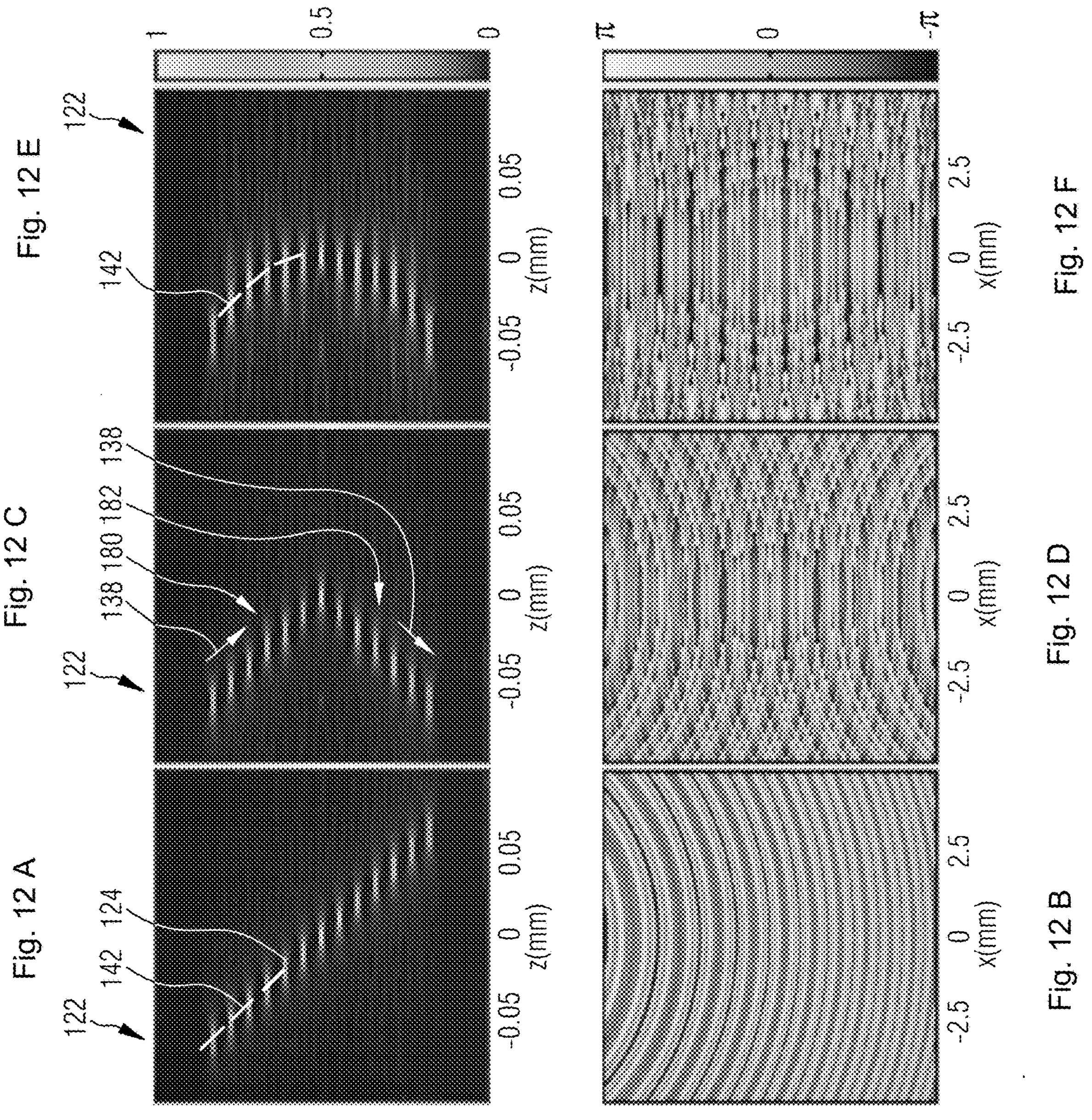
FIGS. 12*a*, 12*c*, and 12*e* show cross-sectional illustrations of simulated intensity distributions of three different exemplary embodiments of the focal zone.
FIGS. 12*b*, 12*d*, and 12*f* show schematic illustrations of phase distributions assigned to the cross-sectional illustrations as per FIG. 12*a*, FIG. 12*c*, and FIG. 12*e*, respectively.

In the example shown in FIGS. 12*a* and 12*b*, the focal distributions 124 are arranged along the longitudinal axis 142 of the focal zone 122, with the longitudinal axis 142 having a rectilinear form. In this case, the focal zone 122 is assigned a single work angle α, for example, by means of which the focal zone 122 is angled vis-à-vis the first outer side 144 and/or the second outer side 146. In particular, the focal zone 122 in this exemplary embodiment has the same local direction of extent 138 throughout, which is to say the local direction of extent 138 is constant over the entire extent of the focal zone 122 in particular.

In the exemplary embodiment according to FIGS. 12*c* and 12*d*, the focal zone 122 has a first portion 180 and a second portion 182, wherein the focal distributions 124 of the focal zone 122 are arranged in the first portion 180 and in the second portion 182 with a different local direction of extent 138 in each case. By way of example, the focal zone 122 in this exemplary embodiment has the same local direction of extent 138, respectively throughout, in the first portion 180 and in the second portion 182.

In particular, the focal zone 122 has the same work angle α in the first portion 180 and in the second portion 182, the focal zone 122 being angled at said work angle in relation to the first outer side 144 and/or the second outer side 146. In particular, the smallest angle between the respective local direction of extent 138 of the first portion 180 and of the second portion 182 is twice as large in that case as the work angle α.

The longitudinal axis 142 of the focal zone 122, along which the focal distributions 124 are arranged, need not necessarily have a rectilinear form. By way of example, provision can be made for the longitudinal axis 142 to have a curved form at least in certain portions. By way of example, in the examples shown in FIGS. 12*e* and 12*f*, the focal zone 122 has a curved form throughout.

By way of example, the focal zone 122 then has a varying local direction of extent 138, which is to say the local direction of extent 138 of the focal zone 122 is respectively different at different positions of the focal zone 122 and/or at different focal distributions 124 of the focal zone 122.

FIGS. 12*b*, 12*d*, and 12*f* each show a phase distribution assigned to FIGS. 12*a*, 12*c*, and 12*e*, respectively, of beams output coupled from the beam splitting element 112, wherein the assigned grayscale value scale ranges from white (a phase of +pi) to black (a phase of −pi).

The apparatus 100 according to embodiments of the invention operates as follows:

To carry out the laser machining, the material 102 of the workpiece 104 is exposed to the focal zone 122 and the focal zone 122 is moved relative to the workpiece 104 and through the material 102 thereof in the advancement direction 129.

In this case, the material 102 is in particular a material transparent or partly transparent to a wavelength of beams from which the focal zone 122 is formed. For example, the material 102 is a glass material.

By way of example, the focal zone 122 is moved through the material 102 of the workpiece 104 along a predefined machining line 184 and/or machining surface. The machining line 184 may for example have straight and/or curved portions.

Figure 13:
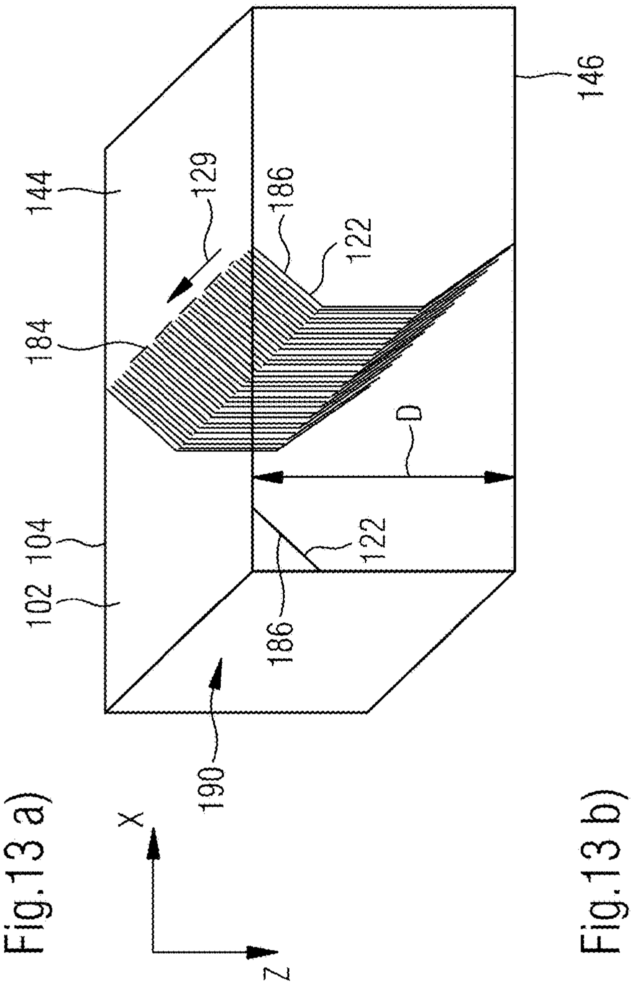
FIG. 13*a* shows a schematic perspective illustration of material modifications which are produced in the material of the workpiece along a machining line and/or machining surface.
FIG. 13*b* shows a schematic illustration of two segments of the workpiece, which are formed by separating the workpiece at the machining line and/or machining surface.
Figure 13:
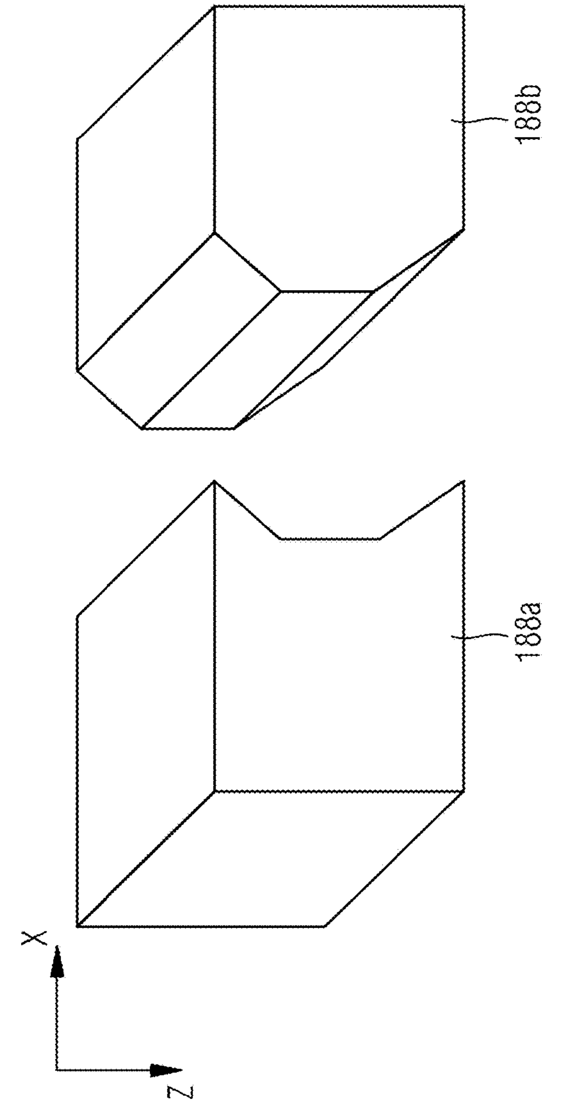

By exposing the material 102 to the focal zone 122, material modifications 156 which are arranged along the longitudinal axis 142 of the focal zone 122 are formed in the material 102 (FIG. 5 and FIG. 13*a*). As a result, modification lines 186 at which the material modifications 156 are arranged are formed in the material, with these modification lines 186 in particular having a form corresponding to the longitudinal axis 142 of the focal zone 122. In the example shown in FIG. 13*a*, the modification lines 186 extend from the first outer side 144 to the second outer side 146.

A plurality of modification lines 186 which are positioned spaced apart from one another parallel to the advancement direction 129 are formed on account of the relative motion of the focal zone 122 vis-à-vis the material 102. In particular, this yields an extensive formation of material modifications 156 in the material 102 (FIG. 13*a*).

By way of example, spacing of modification lines 186 adjacent in the advancement direction 129 can be defined by a suitable choice of a pulse duration of a laser beam, from which the focal zone 122 is formed, and/or of an advancement speed oriented in the advancement direction 129.

In particular, the material modifications 156 formed along the machining line 184 and/or machining surface have a reduction in a strength of the material 102 as a consequence. This makes it possible to separate the material 102 into two different segments 188*a* and 188*b* after the material modifications 156 have been formed on the machining line 184 and/or machining surface (FIG. 13*b*), for example by applying a mechanical force.

In the example shown, the segment 188*b* is a product piece segment with a desired edge shape. In this case, the segment 188*a* is a residual workpiece segment and/or scrap segment.

Preferably, the material 102 is exposed to the focal zone 122 in such a way that the focal zone 122 penetrates through the material 102. By way of example, the focal zone 122 extends through the material 102 continuously and/or without interruptions over the entire thickness D of the material 102. By way of example, as shown in FIGS. 13*a* and 13*b*, a complete separation of the material over its thickness D can be obtained as a result.

It is also possible to machine an edge region 190 of the material 102 by means of the focal zone 122 (indicated in FIG. 13*a*). By way of example, the focal zone 122 then extends continuously and/or without interruptions between outer sides of the workpiece 104 that are oriented at an angle to one another. By way of example, an edge segment can be separated from the workpiece 104 in the edge region 190 as a result. As a result, the workpiece 104 can be beveled and/or chamfered, for example, in the edge region 190.

By way of example, the material 102 of the workpiece 104 is quartz glass. By way of example, for the purpose of forming the material modifications 156 as Type I and/or Type II modifications, a laser beam from which the focal distributions 124 of the focal zone 122 are formed then has a wavelength of 1030 nm and a pulse duration of 1 ps. Further, a numerical aperture assigned to the focusing optical unit 116 then is 0.4 and a pulse energy assigned to a single focal distribution 124 then is 100 nJ.

To form the material modifications 156 as Type III modifications with otherwise unchanged parameters, the pulse energy assigned to a single focal distribution 124 is 1000 nJ.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An apparatus for laser machining a workpiece comprising a material transparent to the laser machining, the apparatus comprising:

a first beam shaping device comprising a beam splitter for splitting a first input beam input coupled into the first beam shaping device into a plurality of component beams, a focusing optical unit assigned to the first beam shaping device and configured to image the plurality of component beams output coupled from the first beam shaping device into at least one focal zone, and a second beam shaping device for beam shaping the first input beam input coupled into the first beam shaping device, wherein the first input beam is split by the beam splitter by phase imposition on the first input beam, wherein the component beams are focused into different partial regions of the at least one focal zone for forming the at least one focal zone, wherein the at least one focal zone is introduced by the focusing optical unit into the material at at least one work angle with respect to an outer side of the workpiece for the laser machining of the workpiece, and wherein material modifications associated with a change of a refractive index of the material are produced in the material by exposing the material to the at least one focal zone, and wherein a first focal distribution with a defined geometric shape and/or with a defined intensity profile is assigned to the first input beam by the second beam shaping device by phase imposition on a second input beam incident on the second beam shaping device, so that focusing of the component beams output coupled from the first beam shaping device into the different partial regions of the at least one focal zone by the focusing optical unit forms focal distributions based on the defined geometric shape and/or based on the defined intensity profile of the first focal distribution.

2. The apparatus as claimed in claim 1, wherein the material modifications produced in the material by the at least one focal zone are Type I and/or Type II modifications.

3. The apparatus as claimed in claim 1, wherein the phase imposition on the second input beam is such that the defined geometric shape of the first focal distribution is elongated in relation to an assigned main direction of extent, and/or wherein the phase imposition on the second input beam is such that the defined intensity profile of the first focal distribution is a quasi-nondiffractive and/or Bessel-like intensity profile.

4. The apparatus as claimed in claim 1, wherein the phase imposition on the second input beam is such that the defined intensity profile of the first focal distribution in relation to an assigned main direction of extent which, proceeding from a maximum intensity at an intensity maximum of the defined intensity profile, falls to $1/e^2$-times the maximum intensity faster than a Gaussian intensity profile by a factor of 3.

5. The apparatus as claimed in claim 1, wherein the phase imposition on the second input beam is such that the defined geometric shape and/or the defined intensity profile of the first focal distribution is that of an abruptly autofocusing beam.

6. The apparatus as claimed in claim 1, wherein an intermediate image of the first focal distribution is formed by the second beam shaping device, and wherein the intermediate image of the first focal distribution is arranged upstream of the first beam shaping device in relation to a main propagation direction of the second input beam.

7. The apparatus as claimed in claim 6, further comprising a far field optical unit assigned to the second beam shaping device, wherein the far field optical unit is configured for far field focusing of an output beam output coupled from the second beam shaping device into a focal plane of the far field optical unit, and wherein the first beam shaping device is arranged in a region of the focal plane.

8. The apparatus as claimed in claim 7, wherein the far field optical unit is configured for far field focusing of the intermediate image of the first focal distribution formed by the second beam shaping device into the focal plane.

9. The apparatus as claimed in claim 7, wherein the far field optical unit and the focusing optical unit form a telescope device, and/or wherein the far field optical unit and the focusing optical unit have a common focal plane, wherein the first beam shaping device is arranged in a region of the common focal plane.

10. The apparatus as claimed in claim 1, wherein the first beam shaping device comprises a beam shaping element for modifying the first focal distribution assigned to the first input beam, wherein the beam shaping element is configured to bring about a modification and/or an alignment of the geometric shape and/or the intensity profile of the first focal distribution, imaged into the at least one focal zone, in a cross-sectional plane oriented perpendicular to an advancement direction, in which the at least one focal zone is moved relative to the workpiece for the laser machining of the workpiece.

11. The apparatus as claimed in claim 10, wherein an alignment of a main direction of extent of the geometric shape and/or the intensity profile of the first focal distribution is adjustable in the cross-sectional plane oriented perpendicular to the advancement direction by the beam shaping element, and wherein the alignment is adjusted so that the main direction of extent is oriented parallel to a corresponding local direction of extent of the at least one focal zone.

12. The apparatus as claimed in claim 1, wherein the first beam shaping device comprises a beam shaping element for modifying the first focal distribution assigned to the first input beam, wherein the beam shaping element is configured to bring about a modification and/or an alignment of the geometric shape and/or the intensity profile of the first focal distribution, imaged into the at least one focal zone, in a cross-sectional plane oriented parallel to an advancement direction, in which the at least one focal zone is moved relative to the workpiece for the laser machining of the workpiece.

13. The apparatus as claimed in claim 12, wherein the beam shaping element brings about the modification of the intensity profile of the first focal distribution in the cross-sectional plane oriented parallel to the advancement direction such that the intensity profile has at least one preferred direction, wherein the at least one preferred direction is oriented parallel or at an angle or perpendicular to the advancement direction.

14. An apparatus for laser machining a workpiece comprising a material transparent to the laser machining, the apparatus comprising:

a first beam shaping device comprising a beam splitter for splitting a first input beam input coupled into the first beam shaping device into a plurality of component beams, and a focusing optical unit assigned to the first beam shaping device and configured to image the plurality of component beams output coupled from the first beam shaping device into at least one focal zone, wherein the first beam shaping device comprises a polarization beam splitter configured so that each of the component beams output coupled from the first beam shaping device has one of at least two different polarization states, wherein component beams with the different polarization states are focused into adjacent ones of the different partial regions of the at least one focal zone by the focusing optical unit, and wherein the first input beam is split by the beam splitter by phase imposition on the first input beam, wherein the component beams are focused into different partial regions of the at least one focal zone for forming the at least one focal zone, wherein the at least one focal zone is introduced by the focusing optical unit into the material at at least one work angle with respect to an outer side of the workpiece for the laser machining of the workpiece, and wherein material modifications associated with a change of a refractive index of the material are produced in the material by exposing the material to the at least one focal zone.

15. A method for laser machining a workpiece with a material transparent to the laser machining, the method comprising:

splitting, using a beam splitter of a first beam shaping device, a first input beam input coupled into the first beam shaping device into a plurality of component beams, wherein the first input beam is split by the beam splitter by phase imposition on the first input beam, focusing, using a focusing optical unit assigned to the first beam shaping device, the component beams output coupled from the first beam shaping device into at least one focal zone, wherein the component beams are focused into different partial regions of the at least one focal zone for forming the at least one focal zone, wherein the at least one focal zone is introduced by the focusing optical unit into the material at at least one work angle with respect to an outer side of the workpiece for the laser machining of the workpiece, shaping, using a second beam shaping device, the first input beam, so that a first focal distribution with a defined geometric shape and/or with a defined intensity profile is assigned to the first input beam, wherein the focusing the component beams output coupled from the first beam shaping device into the different partial regions of the at least one focal zone by the focusing optical unit forms focal distributions based on the defined geometric shape and/or based on the defined intensity profile of the first focal distribution, and exposing the material to the at least one focal zone to produce material modifications associated with a change of a refractive index of the material.

* * * * *